US006566775B1

(12) United States Patent
Fradella

(10) Patent No.: US 6,566,775 B1
(45) Date of Patent: May 20, 2003

(54) MINIMAL-LOSS FLYWHEEL BATTERY AND RELATED ELEMENTS

(76) Inventor: Richard Benito Fradella, 33872 Calle Conejo, San Juan Capistrano, CA (US) 92675

( * ) Notice: Subject to any disclaimer, the term of this patent is extended or adjusted under 35 U.S.C. 154(b) by 0 days.

(21) Appl. No.: 09/480,610

(22) Filed: Jan. 10, 2000

(51) Int. Cl.$^7$ .......................... H02K 7/02; H02K 21/22; H02K 7/09

(52) U.S. Cl. .................................... 310/90.5; 310/74
(58) Field of Search ........................ 310/74, 90.5, 90, 310/153, 68 B; 384/522; 324/207.11, 207.25, 207.26

(56) References Cited

U.S. PATENT DOCUMENTS

| | | | | |
|---|---|---|---|---|
| 3,124,396 A | * | 3/1964 | Barager | 384/522 |
| 4,483,570 A | * | 11/1984 | Inoue | 308/10 |
| 5,204,569 A | * | 4/1993 | Hino et al. | 310/154 |
| 5,392,176 A | * | 2/1995 | Anderson | 360/97.01 |
| 5,419,212 A | * | 5/1995 | Smith | 74/5.1 |
| 5,514,923 A | * | 5/1996 | Gossler et al. | 310/74 |
| 5,754,425 A | * | 5/1998 | Murakami | 364/160 |
| 5,880,544 A | * | 3/1999 | Ikeda et al. | 310/74 |
| 5,977,677 A | * | 11/1999 | Henry et al. | 310/90.5 |
| 6,121,704 A | * | 9/2000 | Fukuyama et al. | 310/90.5 |
| 6,130,831 A | * | 10/2000 | Matsunaga | 363/98 |
| 6,166,472 A | * | 12/2000 | Pinkerton et al. | 310/208 |
| 6,262,505 B1 | * | 7/2001 | Hockney et al. | 310/90.5 |

* cited by examiner

Primary Examiner—Karl Tamai

(57) ABSTRACT

Electric power is stored in a flywheel assembly, from a dc power buss, and supplied to the buss, through electronics associated with a motor/generator, its rotor integral with a flywheel supported by magnetic bearings. The power is reciprocally converted by the motor/generator, controlled by current in its polyphase stator windings, between electricity and kinetic energy. The flywheel and rotor assembly spins around a vertical axis. The rotor contains radial-field permanent magnets attached to supporting outer annular high-permeability steel, attached to inner annular steel. This completes a path for the magnets' field, which interacts with current in the stator windings, to produce torque between the rotor and the stator. Polyphase sinusoidal currents in the stator windings are controlled by the associated electronics, responsive to respective rotation angle sensors and the dc power buss voltage, with override control responsive to flywheel rotation speed, axial and radial position sensors, and operator settings. During normal operation, the flywheel assembly is levitated by axial attraction of its annular high-permeability poles near its top, to a fixed annular permanent magnet and high-permeability poles above it. The stator windings and non-rotating parts are affixed to a sealed and evacuated stationary flywheel enclosure. The flywheel assembly is released by mechanical backup bearings at startup, which then normally remain disengaged until shutdown. During normal operation, the flywheel assembly is levitated by the axial magnetic field, which also provides inherently stable centering. Axial position stability, and continuous axial position adjustment to seek and maintain axial position where force due to the permanent magnet is equal to levitated weight, is provided by a cooperative annular concentric coil whose current is controlled by an axial servo responsive to an axial position sensor. The coil adjusts strength of the magnetic field between the fixed and rotating poles, and thereby dynamically adjusts and stabilizes lift force. A coil current time-integral is combined with axial position feedback, so that average current is continuously adjusted to zero, by axial position adjustment. Radial electromagnets damp flywheel swirling at resonant vibration frequencies, stabilize its spin axis attitude at spin speeds too low for effective gyro stabilization, and constrain radial position during possible earth tremors. At normal spin rates, with the spin-axis at the rotor assembly center of mass, spin-axis verticality is stabilized by gyroscopics and leveled by gravity.

38 Claims, 10 Drawing Sheets

MINIMAL-LOSS FLYWHEEL BATTERY AND RELATED ELEMENTS

REFERENCES

Descriptions of flywheel batteries and their various related elements can be found in U.S. Pat. Nos. 5,614,777 set forth by Bitterly et al; 567,595, 5,708,312, 5,770,909, and 58,644,303 by Rosen et al; 3,860,300 and 4,147,396 by Lyman; 3,791,704 and 4,088,379 by Perper; 5,627,419 by Miller; 4,910,449 by Hiyama et al: 5,760,510 by Nomura et al: 5,777,414 by Conrad; 5,319,844 by Huang et al; 4,444,444 by Benedetti et al; 5,844,339 by Schroeder et al; 5,495,221, 5,783,885, 5,847,480, 5,861,690, and 5,883,499 by Post; 5,705,902 by Merritt et al; 5,044,944 and 5,311,092 by Fisher; 5,107,151 and 5,677,605 by Cambier et al; and 5,670,838 by Everton; plus 3,969,005, 3,989,324, 4,094,560, and 4,141,607 by Traut; and 4,799,809 by Kuroiwa.

BACKGROUND OF THE INVENTION

This invention relates to electric power storage with minimal losses, through power interface electronics and electromechanical energy conversion, in the inertia of a spinning flywheel, and by reciprocal means, stored kinetic energy conversion to electric power. The various component elements of the invention include: A high-speed motor/generator, with cooperative power electronics and magnetic bearings, electronic feedback control servos to stabilize the magnetic bearings, a vertical-axis flywheel, integral with the motor/generator rotor and rotatable magnetic bearing elements, to store kinetic energy, a vacuum enclosure to reduce air drag, mechanical backup bearings that are not engaged during normal service, and a stationary energy-absorbing installation site to safely house the flywheel and its enclosure.

Rechargeable electrochemical batteries are commonly used for storing on-site and portable electric power. Lead-acid types provide the highest energy-to-cost and power-to-cost ratios. But they require frequent maintenance, fail without warning, are very heavy, corrosive, deteriorate over time, consist of mostly hazardous materials with disposal problems, and their lifetimes are limited to under ten years —far shorter if subjected to repeated charge/discharge cycles or not promptly recharged after supplying power. These battery drawbacks have been a major obstacle to on-site solar and wind power installations. To provide power on demand, such installations require power storage that is subjected to daily and highly variable charge/discharge cycles.

Flywheel power storage devices, and the various elements needed for their implementation, have been set forth in the prior art, with various combinations of elements developed as alternatives to electrochemical batteries. The term "flywheel battery" has been used for these combinations of elements related to the prior art, and is used herein by way of reference to the complete power storage and recovery system of this invention.

Flywheel batteries of the prior art can supply only short-term power, and their energy is typically dissipated in less than an hour, due to high idling losses. This energy loss, without supplying output power, is far worse than self-discharge exhibited by electrochemical batteries.

Prior art magnetic bearings, for use in flywheel batteries, that employ thermal, hysteresis, and eddy effects, for moving mechanical devices, to adjust physical positions of magnetic materials for stability control, confront serious stability and reliability problems. Others, using superconductor techniques (conductor repulsion of moving magnets), confront high idling losses.

Magnetic bearings have also been described for flywheels that operate in a weightless space environment. They include, at opposing ends of a flywheel spindle, permanent magnets, and electronic servos to adjust magnetic forces for virtually zero power axial positioning and stabilization. Their design is not suitable for use in a terrestrial environment, as they require opposing magnets far too large and expensive for commercially viable flywheel batteries.

Typical prior art motor/generators, used in flywheel batteries, have efficiency of about 90%, with a substantial part of their loss in core laminations subjected to high frequency pulse width modulation. Moreover, idling loss due to iron cores magnetically cycled by permanent-magnet spinning rotors, causes high self-discharge rates. With such high power conversion and idling loss, excessive heat is generated within the evacuated flywheel enclosure. This heat can cause a variety of failure modes. It also can cause excessive maintenance requirements, which prevent practical and safe installation, of flywheel batteries intended for stationary on-site use.

In the prior art, methods to reduce idling losses have included means for separating the rotor and stator during periods when no power is converted. These methods confront greatly complicated mechanical structures, and inability to quickly respond when the flywheel battery system needs to supply power. As with motor/generators based upon induced field machines (e.g., alternating current induction motors), or various machines having variably excited field windings, when field excitation is removed to reduce idling loss, they cannot perform as generators unless connected to an external power source, such as electrochemical batteries.

A type of motor/generator, known in the art as coreless (in that its stator windings are not in core slots), has also been used in prior art flywheel batteries. They incur high eddy current loss in their stator windings. Those with stepwise commutation also incur rotor hysteresis and eddy loss, when converting power. Rotor heat does not have a conductive path to the enclosure, in systems having contactless magnetic bearings, so high internal temperatures may be incurred. These losses, incurred while converting power and when idling, have heretofore not been adequately investigated and explained, and have been mistakenly attributed to skin effect.

Explosion hazard of spinning flywheels is a serious concern. Safety measures, that depend on the flywheel's vacuum enclosure to contain a possible exploding rim, add significant cost and weight, and are not always effective. Almost all fiber-composite rim flywheel batteries spin at rim surface speeds above Mach 1. They are contained within evacuated enclosures, to prevent high windage losses. Maintenance needs of prior art flywheels preclude the safe, low cost siting and installation methods set forth in this invention.

In the prior art, idling loss has been largely due to friction in mechanical bearings, and to motor/generators and magnetic bearings that magnetically cycle iron as the rotor spins, causing substantial hysteresis and eddy losses. The prior art also includes many combinations of magnetic bearings that are stabilized and assisted by mechanical bearings of various types. Some use a motor/generator having standard mechanical bearings, coupled to a flywheel by materials having radial compliance to minimize vibration stresses.

Mechanical bearings of the prior art incur serious heating and wear, running in vacuum at sustained high speed. Very high operating temperatures of critical parts, has been caused by high localized heat generation compounded by low heat transfer, further compounded by lubrication loss accelerated by lubricant boil-off in vacuum. These conditions have resulted in early mechanical bearing wear, deterioration, and high failure rates.

Vacuum loss in the prior art necessitates relatively frequent maintenance to keep windage loss at acceptably low levels. High temperatures cause lubricants to boil and some composite fiber flywheel resins to outgas into a relatively small evacuated enclosed space. In the prior art, the enclosed space has been small, to minimize size and weight of the enclosure, which has thick walls designed to contain a possible exploding flywheel rim. A small enclosure space, with high internal temperatures and materials that outgas, does not reliably maintain a vacuum.

At high temperature, even coercive force of permanent magnets is reduced. This has required more adjustment of magnetic bearings, imposed higher loads on mechanical bearings, and caused reduced torque vs. current of motor/generators, with reduced back-emf vs. rotational speed.

BRIEF SUMMARY OF THE INVENTION

Flywheel power storage systems that are not subject to the aforementioned drawbacks and limitations would afford significant improvement to numerous useful applications. These include uninterruptible power supplies (UPS) to sustain critical electric power functions (during power outages), in buildings commonly served by a central power grid, and UPS plus power storage for on-site distributed solar and wind power systems.

Therefore, general objectives of this invention are to provide improved long-life flywheel batteries, for stationary installations, without the power losses, internal heating, vacuum loss, maintenance, explosion hazard, high cost, and malfunctions of the prior art; plus improvements to related elements needed for the flywheel batteries.

A primary and specific objective is to provide a flywheel battery having a motor/generator with no magnetic hysteresis and minimal eddy current losses, and with mechanical bearings used only as temporary backup; its rotor integral with magnetic bearings that need virtually no steady-state power to drive their axial and radial position stabilizing electromagnets, that also do not incur magnetic hysteresis and eddy current losses, and that can use low-cost magnets.

Another specific objective of this invention is to provide electromechanical power conversion at greater efficiency, with less idling loss, by the flywheel battery motor/generator. This also minimizes stator winding heating, resulting thermal stresses, and possible outgassing of resin molding, and provides maximum overall energy storage efficiency.

Another objective of this invention is to especially minimize losses and consequent heat in all flywheel parts which spin in the vacuum enclosure without physical contact and thermal conduction paths to any stationary parts that can transfer heat out of the enclosure, to minimize thermal stresses and composite fiber flywheel resin outgassing.

Another objective is to eliminate need for lubricants in mechanical backup bearings, to remove a cause of vacuum loss, frequent maintenance, and mechanical bearing failures.

Another objective is to maintain all electronic components, and critical regions therein, at cool temperatures, with minimal temperature cycling; also to provide low cost rotor angle and axial and radial position sensors and circuits with good signal integrity that is substantially free of ground loops, extraneous pickup, and cross-talk and further to provide over-current and over-voltage protection for the electronic components.

Another objective, consistent with and dependent upon the previous objectives, is to provide a flywheel battery that does not require maintenance over a very long service lifetime; to reduce maintenance cost and especially to reduce need for access to the flywheel and its vacuum enclosure, so as to facilitate housing the flywheel in a site capable of absorbing any possible explosive blast, in the possible event of a flywheel rim disintegration, to protect people in and around the building served, and prevent damage to the building, from a flywheel explosion.

Another objective of this invention is to detect possible flywheel rim deterioration or seismic shaking, by resulting flywheel axial and radial vibration, and begin a controlled flywheel slowdown and spindle capture by backup mechanical bearings, to minimize flywheel damage and prevent explosion, from possible rim disintegration or electronic control malfunction.

Yet another objective, consistent with and dependent upon the previous objectives, is to produce a low cost and low weight vacuum enclosure for the flywheel, with more interior vacuum space than in the prior art, to maintain vacuum longer, without maintenance, and to enable safe flywheel operation, installed and housed in a stationary site as described herein.

Accordingly, a flywheel battery system and its component elements are herein described, which achieve these objectives, plus other advantages and enhancements. These improvements to the art will be apparent from the following description of the invention when considered in conjunction with the accompanying drawings wherein:

DETAILED DESCRIPTION OF THE INVENTION

Figure 1:
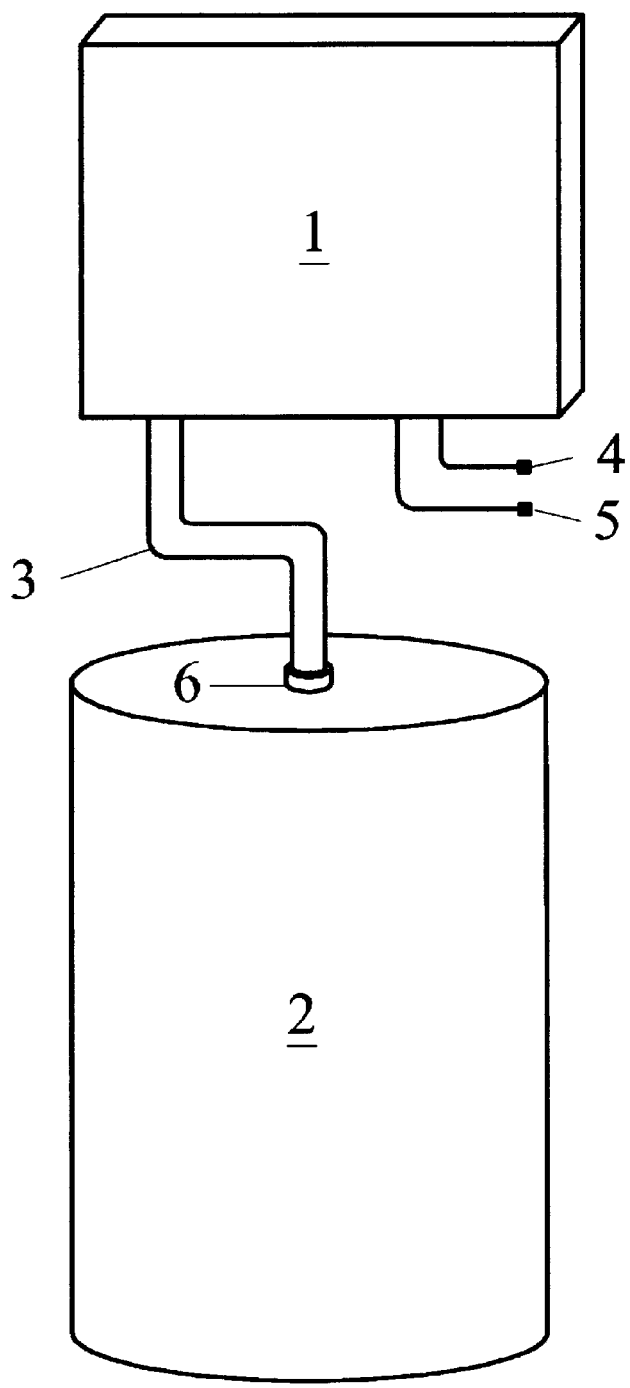
FIG. 1 illustrates a simplified block diagram of the flywheel battery, connected to store power from, and supply power to, a dc power buss.

The flywheel battery system is herein described in relation to its general use for storing on-site electric power in a stationary installation, by way of reference to FIG. 1, followed by detailed descriptions of its component elements and general variations.

FIG. 1 illustrates a block diagram of a preferred embodiment of the flywheel battery system according to this invention. Most of the system's electronics is housed in enclosure 1, which interfaces with a dc power buss through respective positive and negative power terminals 4 and 5. Power and feedback signal conduit 3 connects to respective power and signal processing circuits in enclosure 1, and through a hermetic feed-through 6 in flywheel enclosure 2, to corresponding stator windings, electromagnet coils, and flywheel position sensors therein.

A preferred embodiment of this invention will include a conventional circuit breaker having a solenoid actuator with considerable inductance, connected in series between the electronics and the dc power buss. The circuit breaker will disconnect the flywheel battery from the power buss in the event of current overload or line short, thereby preserving all flywheel battery functions and stored energy. Circuit breaker inductance helps to reduce current spikes that could otherwise damage power semiconductors. When the fault causing the circuit breaker to open is corrected, and the circuit breaker re-closed, the flywheel battery will resume normal service.

All electronic circuits will be designed to operate over the full voltage range of the dc power buss. But voltage spikes may be injected onto the buss from a lightning strike, or from a power grid that supplies the buss. Such spikes are usually very short duration (typically microseconds), and do no circuit damage if buss voltage is clamped. In generator mode, the motor/generator control electronics includes voltage feedback plus over-voltage protection, so that it will not inject current onto the buss that can result in buss over-voltage. Electronic circuit and dc buss over-voltage will be prevented with sub-nanosecond response, by a transient voltage suppresser (TVS), similar to a large junction area zener diode. Current through the TVS will be sensed, to directly inhibit and turn off power semiconductors with sub-microsecond response, to prevent the electronics from injecting more current (supplied by the motor/generator) onto the buss. Also, negative voltage feedback to the electronics, from the dc power buss, normally limits current supplied to the buss from the electronics by means of a slower feedback loop, so buss voltage is prevented from rising above prescribed levels by two redundant means.

Figure 2:
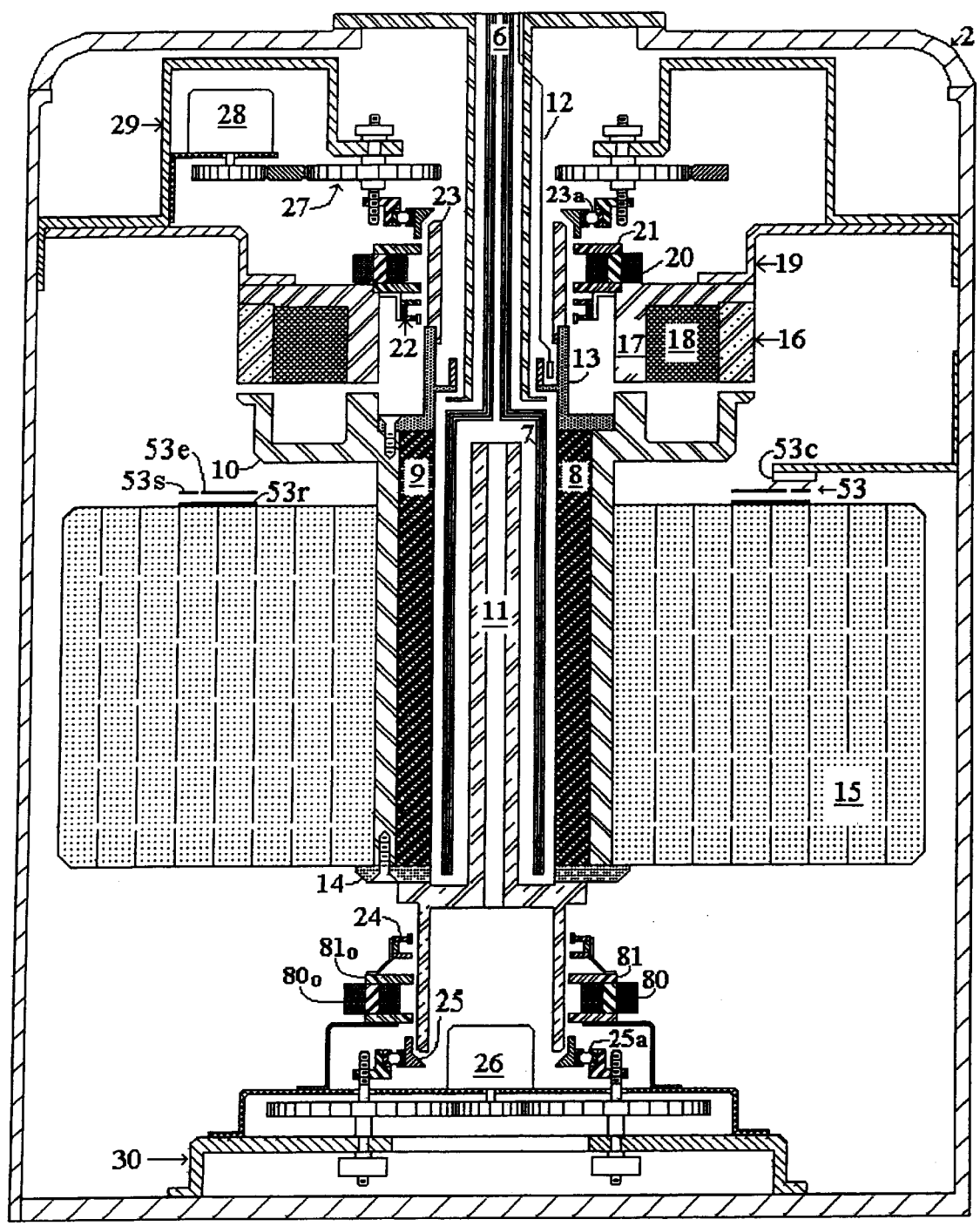
FIG. 2 illustrates a cross-sectional view through the spin-axis, of the flywheel, magnetic bearings, motor/generator, backup mechanical bearings, and stationary vacuum enclosure.

FIG. 2 illustrates a cross-sectional view in a plane through the center of stationary vacuum enclosure 2, the flywheel spin axis, the motor/generator, the magnetic bearings, and the backup mechanical bearings. Scale is not exact, in order to show and identify essential parts.

Essentially sinusoidal polyphase current through the motor/generator stator windings 7 is conducted through hermetic feed-through 6, controlled by power stages of the electronics in enclosure 1. The motor/generator control electronics is responsive to substantially sinusoidal feedback signals from rotation angle sensors, through feedback conductors typified by 12.

This electronics is also responsive to the dc power buss voltage, rotor spin speed, an axial position signal, and to signals from a plurality of radial position sensors at the top 22 and bottom 24 of the rotor spindle, which can override other input variables to prevent flywheel damage in the event of abnormal vibration due to flywheel rim disintegration or earthquakes.

Figure 3:
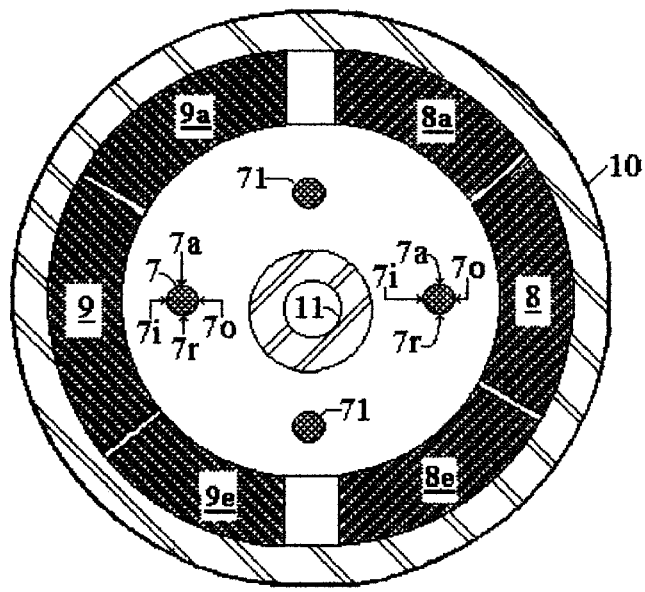
FIG. 3 illustrates an axial cross-sectional view of the motor/generator.

The motor/generator rotor produces a radial pattern magnetic field having two or more poles (of even number) and magnetic intensity that varies as an approximate sinusoid with rotation angle, in the region between radially magnetized permanent magnets 8 and 9 having respective opposite polarities and high-permeability inner steel core 11. This magnetic field interacts with a magnetic field produced by current in stator winding 7 (and 71, which is shown in FIG. 3).

Flux from this field continues through return paths provided by high-permeability steel core 10, which also physically contains and supports magnets 8 and 9 against high centrifugal forces that accompany high speed rotation. Non-magnetic annular top shoulder 13 constrains the rotor magnets at their top sides, and provides co-rotating attachment for a high-permeability spindle extension 23, and for a high-permeability ring (shown in FIG. 2) that provides an inner closed magnetic path plus electromagnetic shielding from stator current for rotation angle sensor 12.

Linear Hall-effect sensors or, alternatively, magnetoresistors constitute the preferred embodiment for each of at least two rotation angle sensors. Magnetic sensors, such as these, can sense a lower amplitude replica of the magnetic field at the stator windings, provided by the rotor magnets through 13 and a relatively long gap. The sensors provide feedback signals which vary sinusoidally in synchronism with back-emf from a stator winding having corresponding phase. Back-emf peak amplitude is proportional to speed. Feedback signals from the sensors vary sinusoidally with position only (with peak amplitude independent of speed).

The high-permeability ring shown in FIG. 2 is attached to 13. It Provides a closed path for the rotor field through magnetic sensor 12, outside the stator windings. And it provides magnetic shielding for these sensors, from stray magnetic fields caused by stator winding currents. It also minimizes flux cycling of stator iron near it, from the rotor field.

Lower shoulder 14 is attached to annular steel 10. It supports the rotor magnets at their bottom sides, provides attachment to co-rotating inner core 11, and supports co-rotating flywheel rim 15. The flywheel rim preferably consists of concentric fiber composite cylinders, with an elastomeric resin bond between each cylinder. To minimize cost, the cylinder capable of the highest working tensile stress would have the largest diameter, and lower cost (albeit lower strength) cylinders would be used for successively smaller diameters. Flywheel rim 15 inner diameter may be bonded to annular steel 10 by an elastomeric resin.

Co-rotating high-permeability steels (mainly 10 and 11) complete the magnetic paths for the rotating magnets of the present invention. The field resulting from polyphase sinusoidal stator current rotates in synchronization with the rotor. So rotor steel and magnets do not incur magnetic cycling. Their hysteresis and eddy losses are thus virtually zero. In contrast, much of the prior art contains rotating and non-rotating magnets and magnetic materials in alternating or highly variable fields, so as to incur magnetic cycling and resultant high hysteresis loss. Prior art permanent-magnet rotor motors, having laminated iron salient pole stator cores, are one example. Magnets and electromagnets of magnetic bearings, which levitate high-permeability cylinders rotating around horizontal axes in particular, provide another example of such lossy prior art.

This motor/generator embodiment is a high-speed adaptation based upon principles of the general and the coreless axial-field regenerative servo motors set forth in my U.S. Pat. Nos. 4,085,355 and 4,520,300. Eddy current blocking and bucking methods set forth hereinbelow, with reference to FIG. 3, FIG. 3a, and FIG. 4, can significantly reduce dominant idling losses, due to eddy currents in stator windings of all coreless motors and motor/generators.

The motor/generator set forth herein has improvements and enhancements to achieve virtually zero magnetic hysteresis losses, because essentially no high-permeability steel and no magnets are subjected to continuous magnetic flux cycling nor to magnetic flux variation, due to rotor spin or interaction with stator current.

With reference to FIG. 2, the rotatable rotor assembly, attached to its vertical-axis spindle and to flywheel rim 15, is axially levitated by attraction forces between concentric high permeability steel poles at the upper end of rotating member 10, the lower side of non-rotating, annular, axially-magnetized, permanent-magnet ring 16, and the lower side of non-rotating, high-permeability, annular steel 17, affixed to enclosure 2 by support member 19. Concentric coil 18 is provided bi-directional drive current, by its associated axial servo electronics, responsive to an axial position sensor, to stabilize the axial levitation. These cooperative elements comprise the axial component of contactless magnetic bearings. They also provide inherently stable centering forces, due to the same magnetic field that provides axial levitation. The pole shapes shown here provide higher centering forces, compared to pole shapes shown in the prior art.

This magnetic levitation configuration has features to achieve virtually zero hysteresis losses, because no iron and no high-permeability steel and no magnets are subjected to continuous magnetic flux cycling, nor to substantial magnetic flux variation, due to rotor spin.

Also, all magnetic paths are effectively closed by high permeability materials, except in the pole gaps producing the required magnetic forces. This minimizes stray magnetic flux and maximizes required magnetic forces from permanent magnets and electromagnets. By using the full flux density capability of high-permeability steel, it also minimizes size and weight of steel poles near the top of the rotor assembly.

Figure 11:
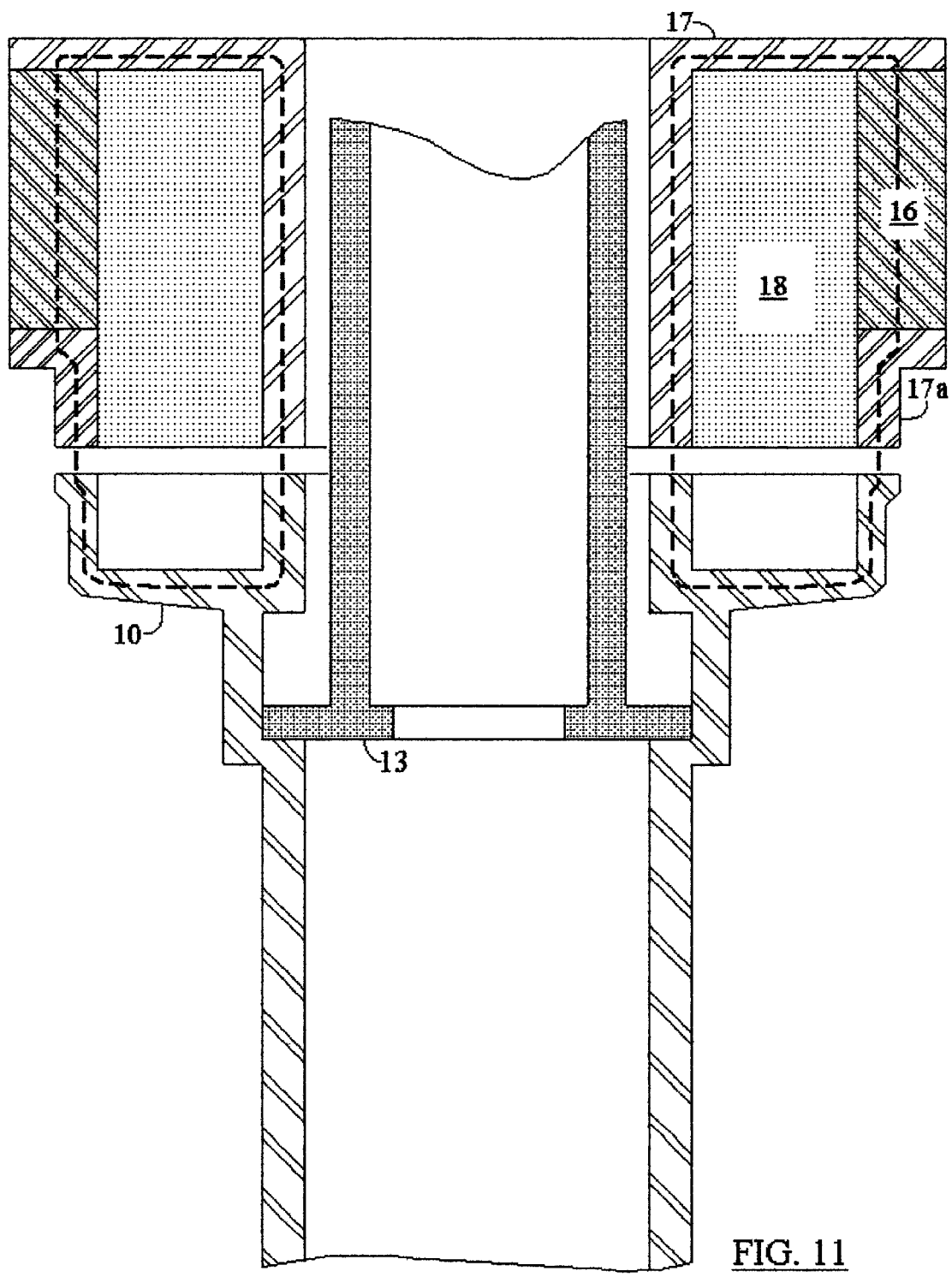
FIG. 11 illustrates a partial cross-sectional view through the spin-axis and through an alternate embodiment of the axial levitation magnetics.

Another embodiment of the axial levitation magnetics is illustrated by FIG. 11, a partial cross-sectional view in a plane through the spin axis. It has features to better accommodate a low-cost fixed ceramic magnet 16. It mainly differs from the embodiment of FIG. 2 by the addition of a fixed high-permeability annular pole 17a, which with fixed annular pole 17 concentrates the magnetic field of the levitation poles. In FIG. 11, the main flux path, for permanent magnet 16 and current in coil 18, is denoted by the wide dashed lines through 16, 17, the inner pole gap, rotatable pole 10, the outer gap, and 17a.

Except for stray flux, magnetic flux density through 16, 17, and 10 in FIG. 2, and through 16, 17, 10, and 17a in FIG. 11, is inversely proportional to the respective cross-sectional areas of these materials. For example, if pole widths of 17 and 17a are equal, and if the diameter of 17a is double that of 17, then 17a will have an annular pole area, along with respective gaps to the poles of 10, approximately double that of 17. So flux density at 17 would be approximately double that at 17a. Likewise, if width of magnet 16 is double that at the pole of 17a and its adjacent pole 10, then flux density at the gap of 17a and 10 will be approximately double that at magnet 16. This is realized only with very small pole gaps, because stray flux increases considerably as pole gaps increase. To achieve zero steady-state current in coil 18, axial pole gap needs to be selected so that it is proportional mainly to parameter variations of magnet 16.

Magnet 16 is preferably a ceramic ferrite, having a flux density of 4000 gauss at zero oersted. Steel pole materials have arbitrarily high permeability at flux densities to 16000 gauss, each have widths (i.e., outer minus inner radius) approximately half that of the magnet, and, to facilitate this explanation, flux paths through the pole gaps are first considered to be infinitesimally short. Then distinct features of the axial levitation can be seen from this example:

Because magnetic forces of attraction are proportional to flux density squared, and to pole area, poles which concentrate flux into half as much area can approximately double the force of attraction between them. Flux density at 17a will be approximately 8000 gauss, for this example. And flux density at 17 will be 16000 gauss. So the axial force between 10 and 17 would be approximately double that between 10 and 17a. Force exerted between cooperating poles having a smaller diameter helps to reduce need for servo control of tilt instability.

Relatively thin annular poles, between 10 and 17, having width equal to the pole between 10 and 17a, enable a higher centering force gradient, for the inherently stable centering that they provide. With increasing distance between the fixed and rotatable poles, stray flux increases; and flux density in magnet 16 may decrease to 3000 gauss, with 5000 gauss in the gap between poles 17a and 10, and 7500 gauss in the poles between 17 and 10. Accordingly, levitation pole gaps will be small, consistent with dimensional and magnet property tolerances.

Pole 17a (along with the other cooperative steel poles) provides a pole face that can be very precise and have consistent high-permeability. So any chips, cracks, or defects of magnet 16 do not cause flux variation in the levitation pole materials or the magnet, with rotor spinning. Also pole 17a, after it is installed, protects magnet 16 from damage during subsequent assembly and test procedures. Ceramic ferrite magnets are low cost, but have relatively low strength. Chips and cracks are inevitable. Only their flat surfaces are normally ground and relatively precise, but may have cracks. With pole 17a in combination with pole 17, as shown in this invention, possible point-to-point variations in properties of magnet 16, and irregularities of its annular surfaces, will not degrade levitation performance or cause hysteresis or eddy losses.

A plurality of radial electromagnets at the top of the rotor spindle, represented by coil 20 and high-permeability steel cylinder 21, affixed to the flywheel enclosure, are juxtaposed around annular rotor steel 23, to produce attractive radial forces at the top of the rotor assembly. Servo control, for this upper electromagnet and the one diametrically opposite it, is responsive to upper radial sensor pair 22.

A minimum number of electromagnets, at respective upper and lower locations, is three, placed 120° apart. The minimum number of sensors, with three electromagnets, is two, which would require signal processing to produce a third feedback signal derived from the two sensor signals. A preferred embodiment of the invention has four electromagnets, at respective upper and lower axial positions, 90° apart, and two pairs of diametrically opposed sensors, aligned with the electromagnets, 90° apart. One pair of sensors provides radial position feedback for servo electronics controlling the pair of electromagnets aligned with that sensor pair. The other sensor pair provides feedback to control the electromagnet pair aligned with it.

Figure 9:
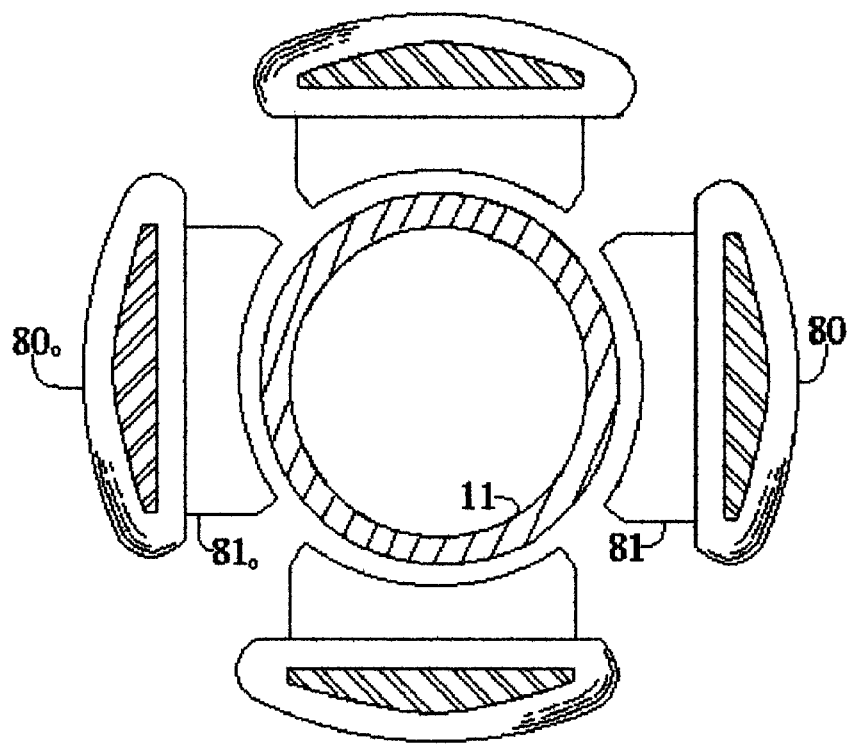
FIG. 9 illustrates an axial cross-sectional view through the lower radial electromagnets.
Figure 10:
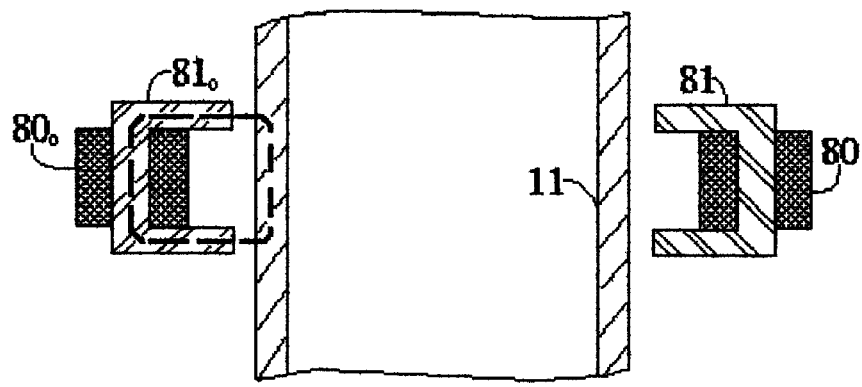
FIG. 10 illustrates a partial cross-sectional view in a plane through the spin-axis and through two lower radial electromagnets.

An identical set of electromagnets, to produce controlled radial forces at the bottom of the rotor assembly, is represented by electromagnet coils 80 and 80$_o$ and iron 81 and 81$_o$ affixed to the enclosure, and rotor steel 11. A cross-sectional view, in a plane perpendicular to the spin axis, and through the center of these lower radial electromagnets, is illustrated in FIG. 9. A partial cross-sectional view through the spin-axis is illustrated in FIG. 10, which also illustrates the main flux path through the poles 81$_o$ of the radial electromagnet diametrically opposite 81.

The flux path is shown as a wide dashed line, which loops through the electromagnet's core and an annular section of inner rotor core 11. Servo control, for the two diametrically opposed radial electromagnets shown, is responsive to lower radial sensor pair 24 (shown in FIG. 2).

The upper and lower electromagnets provide radial vibration damping and radial position stiffening, to limit rotor assembly swirling and to dampen radial vibration due to production tolerance eccentricities at resonant frequencies. They also limit radial excursions at spin rates too low for effective gyroscopic stabilization of the spin axis, and constrain relative radial motion between rotating and fixed elements during possible earthquakes.

Radial electromagnet iron 21 is affixed to the enclosure by supporting member 19. Radial electromagnet iron 80 is likewise affixed to the enclosure by supporting member 30.

Practitioners of this art will recognize that the radial electromagnets described above, to exert force, require power to drive their respective coils, and that they subject their cooperating cylindrical high-permeability rotor sections to magnetic cycling when the rotor spins.

Each of the two rotor sections (one at the top and one at the bottom of the rotor assembly) are subjected to flux density that cycles between zero and the maximums needed to produce radial forces required to maintain prescribed radial position. The magnetic flux path, moving relative to the rotor steel as it spins, is illustrated by wide dashed lines in FIG. 10.

To minimize this power loss and resultant heating, this invention includes the following improvements over the prior art:

The vertical flywheel spin axis of this invention does not require radial forces to support the flywheel against radial gravitational forces, as do flywheels with horizontal spin axes.

In prior art, flywheels having horizontal spin axes are supported by a combination of permanent magnets and stabilizing electromagnets, with opposite poles orientated along the same cylindrical steel rotor section (i.e., rotated in place, to 90° from the electromagnets of this invention). They incur heavy continuous losses, to levitate spinning rotors.

Also, the radial electromagnets' moving magnetic path, on rotor sections of this prior art, is essential radially inward, to circumferential, to radially outward, and completing its closed magnetic path. Radial paths in the rotor, of this prior art, incur continuous magnetic cycling between plus and minus the maximum flux levels required to produce forces to support the spinning flywheel weight. At equivalent force levels to those produced by radial electromagnets of this invention, this prior art could sustain continuous hysteresis losses in rotor steel, due to rotor spin, amounting to roughly double or more, of the peak, and only temporary, hysteresis losses sustained by the rotor steel according to this invention.

Moreover, servos controlling the radial electromagnets of the present invention have a prescribed zero-crossover deadband, so they will not produce restoring forces unless radial speed or displacement exceeds design tolerance levels. Therefore, they are energized only rarely, and remain inactive during normal operation of this flywheel battery. Average power to drive them, and consequent magnetic hysteresis and eddy losses, are thus virtually zero.

The vertical spin-axis and improved method of rotor levitation, stabilization, and stiffening of its axial and radial position, provided by this invention, will have the following described additional benefits over the prior art:

Axial levitation forces, that provide lift forces acting only at the top of the rotor assembly, combined with downward gravitational forces on a rotor assembly having a low center-of-gravity, produce a leveling torque that can maintain spin-axis verticality within one degree or so, relative to level non-rotating elements of the flywheel. This leveling torque is very useful, in that it counteracts precession torque due to earth rotation. A low center-of-gravity helps, because even a few degrees of tilt will cause magnetic fluctuation and resulting hysteresis losses in the annular materials of the axial levitation magnetics.

The rotor assembly, spinning at very low speed, may tilt and wobble, due to even slightly unbalanced rotor assembly mass distribution and axial magnetic lift forces. Small diameter axial lift magnetic poles, and a rotor assembly having a low center of gravity, alleviate such tilt. The radial electromagnets stabilize it whenever needed.

At low spin speed, the radial electromagnets may need to occasionally exert radial forces, to maintain spin-axis centering and verticality within a selected dead-band tolerance of the servos controlling them. However, at spin speeds above about 10% or so of maximum, gyroscopic effects will stabilize the flywheel against spin-axis wobble. So the radial electromagnets are needed to control spin axis verticality at very low spin speeds, such as during rare power-up and power-down, but need not be energized during normal operation.

Flywheel spin speed at 10% of maximum corresponds to 1% of maximum energy storage. However, at 10% of full speed, back-emf is 10% of maximum; and mainly due to current limits of the power electronics, charging and discharging power is limited to 10% of the power at full speed, unless current is boosted by a factor of ten. This would require very expensive power electronics, and reduce motor/generator efficiency considerably. So the preferred embodiment will operate between about 40% and 100% of full speed, corresponding to about 20% and 100% of full energy capacity. With lower speed restricted to 40% of maximum, power electronics can be rated to conduct current with at least a 40% design margin at 40% of maximum speed and 100% at maximum; and the flywheel would be oversized about 20% to provide full rated energy output when it is decelerated from full speed to 40% of full speed.

A mechanical backup bearing 23a at the top of the rotor spindle, and 25a at the bottom, engaged by contact at beveled backup bearing touchdown surfaces 23 and 25 with mating contact surfaces on the rotor assembly, will be engaged during flywheel battery storage, transit, and installation procedures. Beveled surfaces 23 and 25 restrict both axial and radial excursions.

Backup bearings may also be engaged, by mechanisms like 27, to prevent internal flywheel damage, in the event that electronic control of the magnetic bearings is lost, due to accidental in-service disconnection or electronic component failure.

The bottom backup bearing is engaged and disengaged by gearing driven by a small electric motor 26. Parts of the bottom backup bearing, which do not spin with the rotor, are affixed to the enclosure by support member 30. Similar parts at the top are affixed to the enclosure by support member 29. The top backup bearing is engaged and disengaged by gearing mechanism 27, driven by a small electric motor 28.

To protect the flywheel in the event of electronics malfunction, a preferred embodiment of this invention will provide in the flywheel enclosure a large capacitance, supplied through a rectifier, to store power for driving motors such as 26 and 28.

Any possible electronics malfunction or disconnect can be configured to release a trigger to a device such as a silicon controlled rectifier, to drive both motors into the fail-safe engaged positions of the backup bearings.

Motor 28 and the mechanism it drives, for engaging and disengaging the top backup bearing, is not needed in embodiments wherein the outer race of the top backup bearing is affixed to the enclosure. For these embodiments, to activate backup, motor 26 will drive the backup bearing up to the flywheel rotor assembly, until it first engages the bottom contact surfaces, and then further up until the top contact surfaces are engaged.

Ratio of rotor length to flywheel diameter in the preferred embodiment of this invention is higher than the proportions illustrated in FIG. 2, for various reasons: The ratio of active to return wire in the motor/generator can be higher, for greater power conversion efficiency. Signal disturbance to position sensors, from permanent magnets and actuator coils can be reduced, by increasing distance therebetween. A lower center-of-gravity helps to stabilize verticality of the spin axis. Eddy current bucking and blocking methods set forth herein are also facilitated.

In FIG. 2, part sizes are proportioned so that essential components in the flywheel enclosure are therein visible, and so that adequate space is available for numbered component designators. So, to facilitate a clear description of this invention, parts are not necessarily drawn to accurate scale. For example, inner rotor pole 11, to resist bending (due to mass eccentricity relative to the spin axis) at high spin speed, preferably has larger inside and outside diameters, with greater wall thickness, compared to proportions in FIG. 2. This reduces stress at its shoulder, where it is attached to annular support 14, and reduces its flux density. Stator 7, rotor magnets 8 and 9, and outer steel cylinder 10, also have preferably larger diameters, to accommodate a larger diameter inner rotor pole. But the upper levitation poles of 10 have smaller diameters, so they can withstand centrifugal forces at high spin speed, and do not cause undue tilt instability.

Motor/generator improvements provided by this invention are set forth below by way of reference to FIG. 3, FIG. 3a, FIG. 4, and FIG. 4a (which shows the rotor magnetic field paths).

Figure 4:
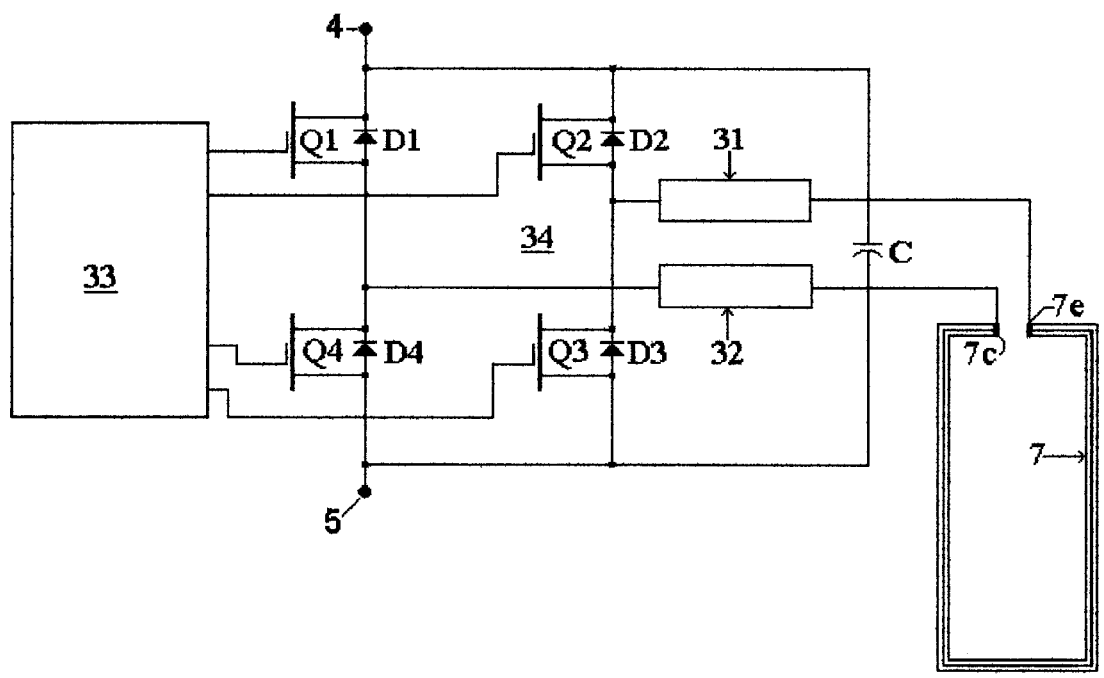
FIG. 4 illustrates motor/generator electronics which control current through a corresponding stator winding, and a simplified representation of its insulated strands.
Figure 4A:
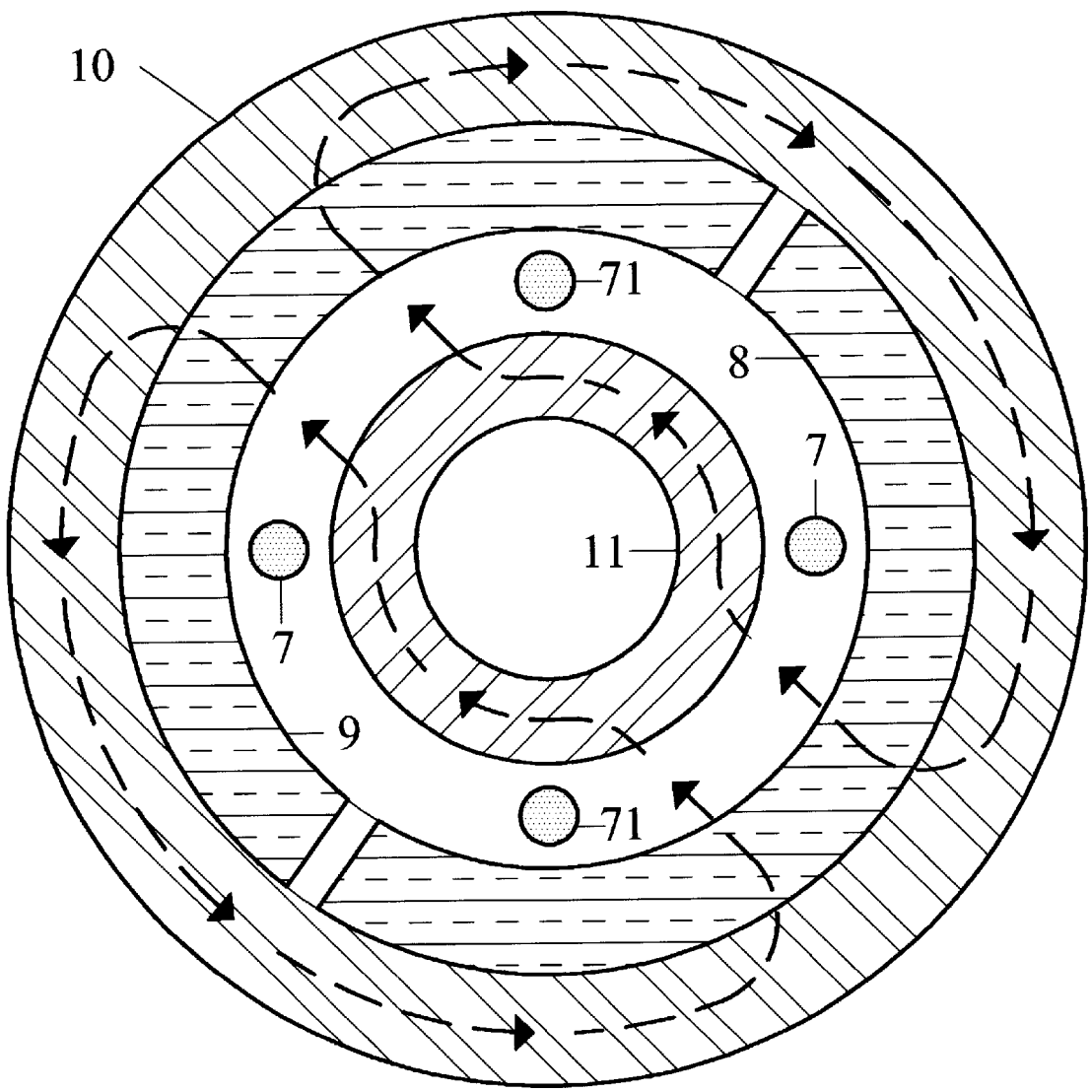
FIG. 4a illustrates main paths for the magnetic field of the motor/generator.

FIG. 3 and FIG. 4a show axial views of cross-sections of a 2-pole 2-phase embodiment of the radial-field motor/generator set forth in this invention. Stator winding 7 is shown in these views, in fixed relation to the second phase winding 71. For this 2-phase embodiment of the invention, shown by way of example, winding 71 is positioned 90° from winding 7.

A 4-phase embodiment of the motor/generator would have an additional two stator windings, displaced 45% from windings 7 and 71. Rotor angle signals and corresponding current control electronics, plus connection therebetween, for two additional phases, would need to be added. A straightforward addition of two more sensors, corresponding electronics, and cabling, would also be needed, or additional feedback signals can be derived by combination, as explained next:

If the minimum two angle sensors (represented by 12 in FIG. 2) provide good sinusoidal vs. rotor angle approximations, a plurality of sinusoidal signals vs. rotor angle for additional phases can be derived by combining them. For example, rotor angle signals needed for the preferred 4-phase embodiment are respective sum and difference of the first two signals scaled by 70.7% (multiplied by 0.707). For a 3-phase embodiment, the two sensors represented by 12 need to be disposed 120° apart. The $3_{rd}$ phase angle signal would then be the negative value of their sum.

Having only 2 poles, but 3 or more phases, would reduce eddy loss in the stator windings, in comparison to maximum motor/generator power, because it results in a smaller flux density gradient over the width of the stator windings. More phases permits smaller diameter stator windings, for the same power handling capability, due to fuller use of stator space. That results in more efficient phasor addition of back-emf and torque from multi-turn windings (which would span a smaller rotor angle), and relatively less eddy losses. These benefits will be explained by the simplified analysis of eddy losses, by way of example, which follows hereinbelow:

Currents through these respective windings, and back-emf across their terminals, have approximately sinusoidal waveforms having 90° relative time phases. Permanent magnets 8 and 9 have radial fields, one with inward polarity and the other outward. In one embodiment, these magnets are tapered symmetrically along their axial direction so their axial dimensions are less at their nearest approach to each other and maximum at their centers. In another, magnets 8 and 9 are preferably neodymium-iron-boron, and magnets 8a and 8e, along with 9a and 9e, are preferably ceramic ferrites supporting about half the flux density for the same thickness.

Both flux shaping methods result in magnetic flux, at the stator 7 and at the rotation sensor 12, that closely approximates a sinusoid, as a function of rotation angle. The resulting magnetic field follows symmetric closed paths through the magnets, the stator winding region, inner high permeability material 11, and outer high permeability material 10.

All elements shown in FIG. 3, except the stator windings, are part of the motor/generator rotor. When the rotor spins, for a moment when it is at the position illustrated, momentary back-emf across terminals 7c and 7e of winding 7 (shown in FIG. 4) is at a maximum, while back-emf across the terminals of winding 71 is at zero. The magnetic field from the rotor magnets rotates with the rotor. Its main paths, through the rotor and stator, are shown by wide dashed lines in a cross-sectional view perpendicular to the spin-axis, illustrated by FIG. 4a.

This type of motor, known in the art as coreless, is characterized by two significant differences from conventional salient-pole motors:

Its stator windings have very low inductance. This requires series inductors 31 and 32, shown in FIG. 4, for stator current control by pulse width modulation (PWM).

H-bridge 34, shown in FIG. 4, provides drive current control at one polarity by switching Q1 at a PWM frequency generally below 100 kHz while Q3 is ON. And it provides drive current control at the opposite polarity by switching Q2 at PWM frequency while Q4 is ON. Diode D4 provides free-wheeling in the first case, and D3 in the second. This operating mode accelerates the flywheel, to store energy.

When electric power is required from the flywheel battery, the H-bridge controls regenerative braking current by switching Q4 at PWM frequency for one back-emf polarity, and Q3 for the opposite. D1 injects current pulses from node 5 into node 4 while D3 free-wheels for the first polarity, D2 and D4 for the opposite. This operating mode decelerates the flywheel, to recover electric power. Power switches Q1, Q2, Q3, and Q4 are preferably semiconductors with good switching characteristics, such as MOSFETs or IGBTs. Diodes D1, D2, D3, and D4 are preferably fast-recovery soft-turnoff rectifiers. MOSFETs have intrinsic diodes; some have adequate reverse recovery attributes to be used for this free-wheeling function. Capacitor C has low loss for high-frequency current. It stores and supplies PWM current pulses.

H-bridge 34 is controlled by PWM driver 33, which is responsive to various input commands, including the feedback signals from the rotor angle sensors. Flywheel rotational speed increase can be inhibited by a vibration discriminator responsive to signals in the axial and radial servos, after processing to determine if axial or radial excursions or rate persist beyond a prescribed time. Dc buss voltage can be regulated as needed by negative voltage feedback from the buss.

Although it requires added inductors, this type of motor/generator facilitates use of ferrite inductor cores having far lower losses in inductors essential to PWM current control. In the prior art that uses salient-pole laminated-iron-core motor/generators, much higher motor core loss is sustained under PWM drive. Also, with that prior art, permanent magnets from a spinning rotor magnetically cycle the stator iron, causing high idling loss due to magnetic hysteresis. In a vacuum enclosure, these losses cause heating, which is not easily transferred away from hot components of a flywheel assembly. Also, the inner rotor permanent magnets of the prior art require high-strength annular bands around them, to prevent their disintegration from centrifugal forces. These bands increase gap length and decrease radial clearance between the rotor and stator. They also increase cost.

Unlike conventional stator windings in slots, with magnetic fields that link them practically confined to their surrounding iron core so that each conductor reacts with the same flux, the motor/generator of this invention has a magnetic field which is not uniform at the stator windings. This also has caused high eddy losses in the prior art, as explained below:

If solid magnet wire stator windings are used, they are subjected to magnetic fields that are not uniform over their relatively large cross-sections. This is illustrated by points 7a and 7r, which are in a magnetic field having a sinusoidal variation with angle (summed over active winding length) around the spin axis that sweeps by these points. It is also illustrated by points 7i and 7o, which are in a magnetic field that is not radially uniform.

Figure 3A:
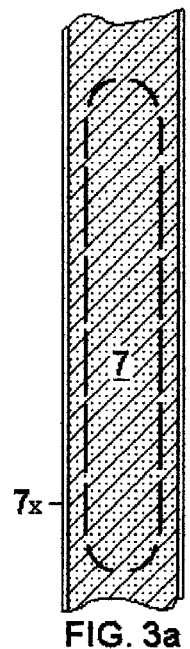
FIG. 3a illustrates an enlarged cross-sectional view of a stator conductor segment, to show a typical eddy current path in the conductor.

Differences in axial EMF induced at 7a and 7r, and 7i and 7o, are thus responsible for eddy currents flowing in concentric eddy loops along the entire two rotor lengths of winding 7 in the rotating magnetic field produced by a spinning rotor. The wide dashed line in FIG. 3a illustrates the eddy current path in a representative segment of stator conductor 7. Insulation 7x is shown at each side of this cross-sectional view. The eddy currents do not produce useful power or energy conversion, because they do not exert net torque, and do not produce back-emf across the stator terminals. They dissipate energy and cause heating in the stator windings.

Eddy loss in winding 71, at the moment of relative rotor position shown in FIG. 3, is considerably higher than in winding 7, because field gradient is maximum when crossing through zero (i.e., between the magnets).

Stranded magnet wire can reduce eddy loss substantially. By way of explanation, if points 7a and 7r, and 7i and 7o, represent cross-sections of very small diameter copper wire strands, each individually insulated from the others by an insulating coating, localized eddy current is prevented unless it flows through the respective winding terminals 7c and 7e where the strands connect. Insulation around each strand blocks eddy current that would otherwise circulate within a large diameter conductor in the rotor field.

For a stator winding wherein individual insulated strands are not spiraled, and straight active conductors are disposed as shown in FIG. 3, EMF generated along a rotor length of strand 7a on one side of the spin-axis will ideally equal EMF generated across strand 7r on the other side. And if, at the bottom of the stator (in the inactive winding segment between the two straight active segments in the rotor field) each strand is interchanged radially about the center of the group, so that 7i and 7o appear as shown at each side of the spin-axis, different EMFs generated over the length of each strand will likewise have equal sums, connected across 7c and 7e. Minimizing loss due to difference current between conductor strands, with these straight active conductors, requires experimentation and consistent careful wire-forming.

This example of eddy bucking (i.e., EMF equalizing over the length of each strand, to prevent difference current flow though one strand that continues through any another, and thus circulating in an equivalent eddy manner through the group of strands) is predicated on symmetric and opposite radial magnetic field strength along a plane passing through the spin axis. Insofar as a part of the sinusoidal flux varies almost linearly across the bundle of strands, the summed EMFs presented at the winding terminals, of each individual strand, disposed in between those shown (7a, 7r, 7i, and 7o), are also equal.

Ideally, effective blocking and bucking (by terminal-to-terminal incremental emf summing that cancels total back-emf differences along each strand's total length) can be achieved by equalizing differences that would otherwise cause eddy currents and their power dissipation.

In production wire forming procedures, maintaining the relative positions of each strand, as set forth herein, requires very specialized tooling. Stranded wire is intentionally spiraled to improve forming qualities, like bending compliance and ability to keep strands in a group. If a slight amount of spiral is not well defined, strand positions may inadvertently be interchanged when formed, from one side to the other. This could cause eddy current losses in stranded conductors, that is comparable to that of eddy loss in solid large-diameter windings.

An easier method to buck and block eddy currents, and yet have the benefits of more compliant forming quality inherent in spiraled stranded wire, is to use a spiral pitch wherein the emf sum of each strand is equalized over several segments within the stator winding length. This method is consistent with the long spindle length set forth herein, to achieve other benefits described above. However, each strand is longer, and consequently has higher resistance, with close spiral twisting. But production costs may be far less than the parallel strand example, whose benefit from shorter conductor length may be overshadowed by forming difficulty. The examples used here explain, with a sequence of winding options, the principles involved. Spiraled, insulated-strand stator windings are one preferred embodiment of this invention. The straight, insulated-strand windings, formed as set forth here, are another.

Litz wire also achieves eddy loss reduction. But it is far more expensive than insulated-strand magnet wire, and is bulkier for the same terminal-to-terminal resistance. Insulated-strand copper wire, commonly known as magnet wire, is less expensive, takes less space, and so makes better use of rotor magnets. Litz wire was developed to reduce losses from high-frequency skin effect, wherein required current through the conductor flows mainly along the surface of large diameter conductors, due to more high-frequency inductive coupling near the center, which restricts current there. It basically reduces conductive area, by forcing more current to flow where inductance is less (i.e., near the conductor skin).

Eddy loss has commonly been confused with skin effect in the prior coreless motor/generator art, particularly when used in flywheel batteries, where idling loss is so detrimental. But idling loss is surely not caused by skin effect, mainly because skin effect restricts effective (i.e., required) current through conductors. Clearly, required stator current is zero during motor/generator idling.

Skin effect may lower motor/generator power conversion efficiency a small amount: A 2-pole rotor spinning at 100,000 rpm which has required stator current at an electrical frequency of 1667 cycles per second, will conduct most of the current through its skin depth of 0.064 inch. That means that even a 0.125 inch diameter copper conductor will be able to conduct current through most of its cross-sectional area. Litz wire may utilize its small diameter strands a bit more, but their total area will be less, and length will be more, than solid or stranded wire. So Litz wire in flywheel battery motor/generators can reduce eddy loss, but will generally have more resistance to stator current, compared to the individually insulated multi-strand conductors set forth herein.

Basic equations defining operation of the 2-phase 2-pole motor/generator as set forth in the present invention are, for one stator phase:

Back-emf (volts)=$0.67 \times 10^{-8} \times$ {number turns per phase}×{stator diameter (inches)}×{field strength (gauss)}×{stator height (inches)}×{rotor rpm}×{sin (rotor angle)}

Torque (inch pounds)=$56 \times 10^{-8} \times$ {number turns per phase}×{stator diameter (inches)}×{field strength (gauss)}×{stator height (inches)}×{peak current (amperes)}×{$\sin^2$ (rotor angle)}

For the other phase, sine terms are replaced by cosine. So the sum of torque from the two phases is proportional to $\sin^2$ (rotor angle)+$\cos^2$ (rotor angle) which will have negligible ripple with reasonably good sinusoidal rotor field distribution. The PWM power electronics sums current through the two phases in accordance with the same relationship, and thereby exchanges current with the dc power buss, which likewise has negligible ripple. All polyphase configurations perform this type of complementary summing, albeit with more terms than this simpler 2-phase example.

Figure 5:
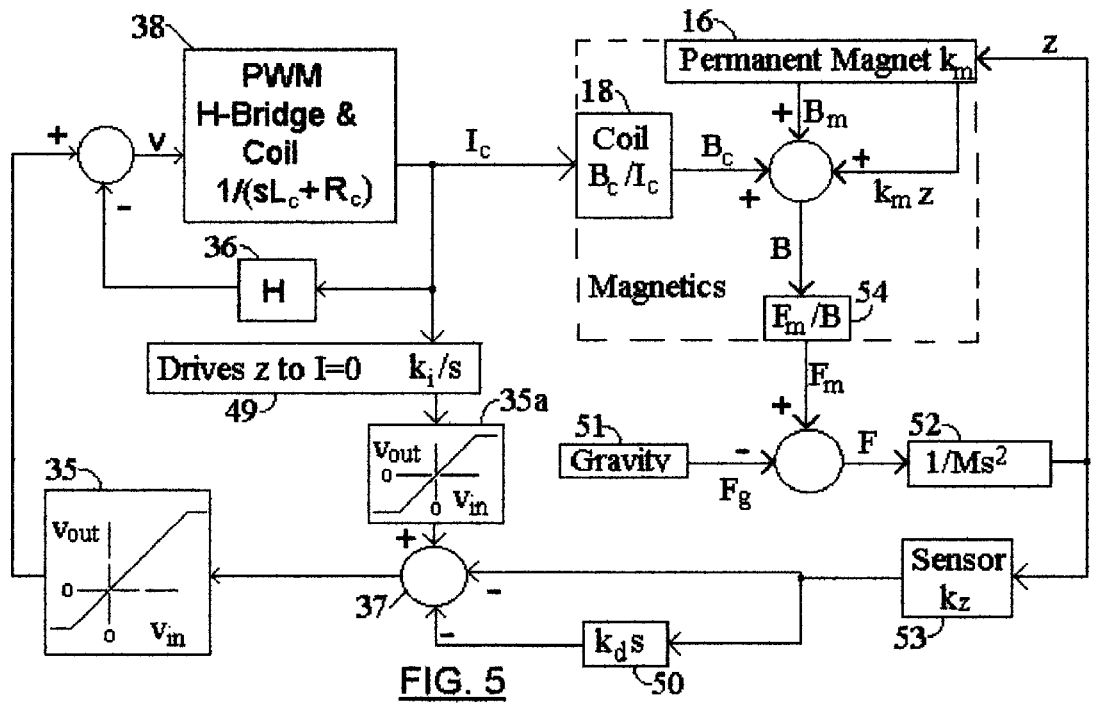
FIG. 5 illustrates a preferred embodiment of a servo loop to stabilize axial levitation.

A preferred embodiment of the axial levitation servo loop is shown in conventional block diagram form, by FIG. 5, a representation well known in the feedback control system art.

Block 35 denotes gain with limiting (especially to prevent excessive negative demagnetizing fields) and a small deadband (to reduce excessive response to small perturbations), 36 is gain, and 37 denotes a summing operation wherever shown here. Block 38 represents the transfer function for a PWM H-bridge and coil 18. The PWM H-bridge here is identical to the one illustrated in FIG. 4, and coil 18 is physically shown in both FIG. 2 and FIG. 11. In block 38, $L_c$ represents the coil inductance and $R_c$ its resistance. Wherever shown here in a transfer function, s denotes the Laplace operator. Block 36 provides current feedback gain to shorten time lag due to inductance $L_c$.

Transfer function $k_m$, which varies as a complex function of rotor assembly position z, also depends on properties of annular, axially-magnetized, permanent-magnet 16, which is physically illustrated in FIG. 2. Rate feedback 50 is denoted by transfer function $k_d s$, and is derived from the axial position sensor 53 denoted by its incremental motion sensitivity $k_z$.

Force from gravity 51 on the rotor assembly, is proportional to its weight 52 denoted by its mass M. Block 49 denotes integrator transfer function $k_i/s$, whose output will drive the feedback loop until the rotor assembly is axially positioned where axial force due to the magnetic field from permanent magnet 16, with current in coil 18 equal to zero, is equal to the rotor assembly weight. Block 49 output is preferably limited intrinsically (shown by 35a) in accordance with levels to accommodate magnet property tolerances, and is capable of both positive and negative axial position adjustment. Maximum output from 35a is less than the maximum output from 53, so that position feedback always determines nominal axial position, with the integrator only adjusting it. Integration can be implemented by analog circuits, or by an up/down counter, depending mainly on production quantity.

Dynamic analysis computer programs can accurately determine stability and response of this servo loop, and can help greatly to optimize it; in combination with a finite element analysis program to accurately characterize magnetostatic fields and forces of elements shown within the dashed rectangle that is labeled "Magnetics."

For example, physical dimensions and properties of coil 18, in juxtaposition with permanent magnet 16 and related annular magnetic materials, would be entered, to determine flux densities B nearby, especially in the gap between their poles, and how axial force $F_m$ varies with incremental position z for a given nominal position. This is then entered into the dynamics analysis to test responsiveness and stability at various positions.

Figure 6:
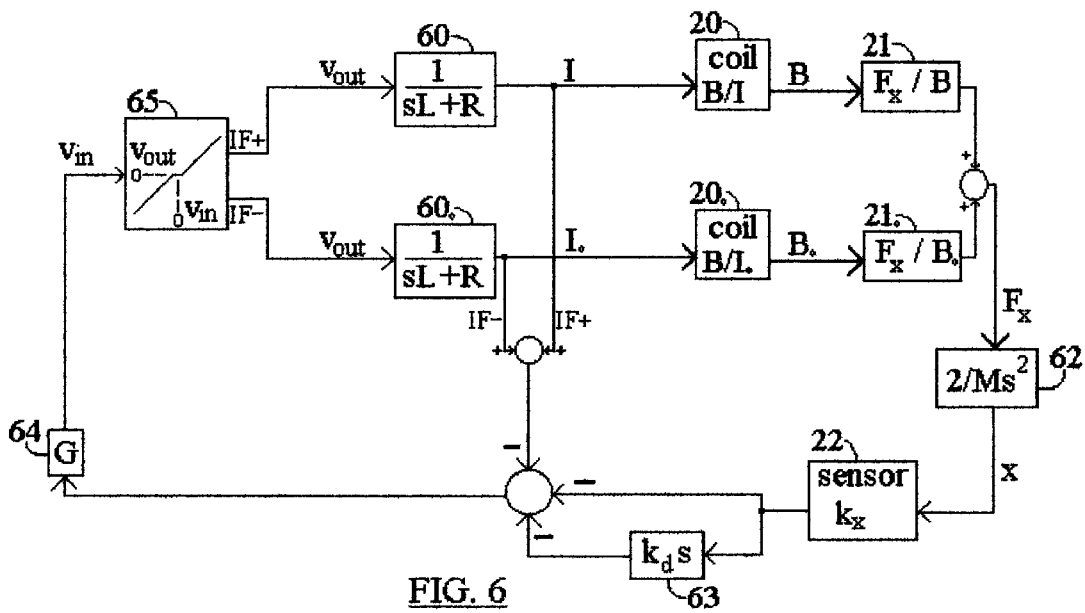
FIG. 6 illustrates one of a plurality of servo loops to control flywheel radial excursions.

FIG. 6 shows a simplified servo block diagram for two diametrically opposite radial electromagnets and associated electronics. Electromagnets at the top of the rotor assembly are represented by 20 and 21, and their radial position sensor by 22, as in FIG. 2. Diametrically opposite electromagnets are represented as $20_o$ and $21_o$. Transfer functions of their respective coils are designated 60 and $60_o$. Their associated servo electronics are designated by transfer functions 63, 64, and 65. Electromagnets at the bottom (80 and 81, opposite $80_o$ and $81_o$, and their sensor 24) are controlled by like servo loops.

Transfer functions B/I and B/$I_o$ for respective opposite coils 20 and $20_o$ denote flux density B vs. coil current I (and $I_o$). Blocks 60 and $60_o$ denote the transfer function 1/(sL+R) of voltage applied to and current through respective radial electromagnet coils. Blocks 21 and $21_o$ denote respective actuator force $F_x$ vs. flux density B at a given nominal position x. Block 62 denotes the dynamic relation of force $F_x$, rotor assembly mass M (with actuators assumed equidistant from its center of gravity), time, and motion x. Block 24 denotes radial sensor 24 sensitivity $k_x$, block 63 is rate feedback $k_d$s, and block 64 is feedback gain.

Zero-crossover dead-band is denoted by block 65, wherein feedback signal $v_{in}$ results in $v_{out}$=0 for prescribed small deviations from geometric center. A polarity discriminator drives a corresponding PWM circuit, with effective value $v_{out}$, if the polarity is true for that output. Otherwise, the coil current free-wheels through a diode. Coil currents I and $I_o$ are sensed internal to the servo loop electronics; and are subjected to the indicated polarity test therein.

Axial and radial position sensors can be implemented by Hall-effect or magnetoresistive magnetic field sensors, or by capacitive, inductive, or electro-optical means, known in the prior art. Hall-effect and magnetoresistive methods require an isolated magnetic source near the rotor assembly, and possible magnetic shielding or separation by distance from stray magnetic fields. Inductive sensing uses rotor steel to complete magnetic paths, and thereby affect inductance of coils linked thereto. It is relatively immune to stray flux, and stable over continued long use, but requires generally more excitation power; and the cooperative rotor steel incurs continuous hysteresis loss. Electro-optic sensing uses a set of light-emitting-diodes and photo-diodes. It is immune to stray magnetic fields. Although light-emitting-diode efficiency decreases somewhat over time, the resulting loop gain reduction does not seriously affect loop dynamics. Capacitive sensing uses the distance between a conductive ring on the rotor assembly, to fixed electrodes juxtaposed therewith, to provide a radial position signal that is also immune to stray flux.

Figure 12:
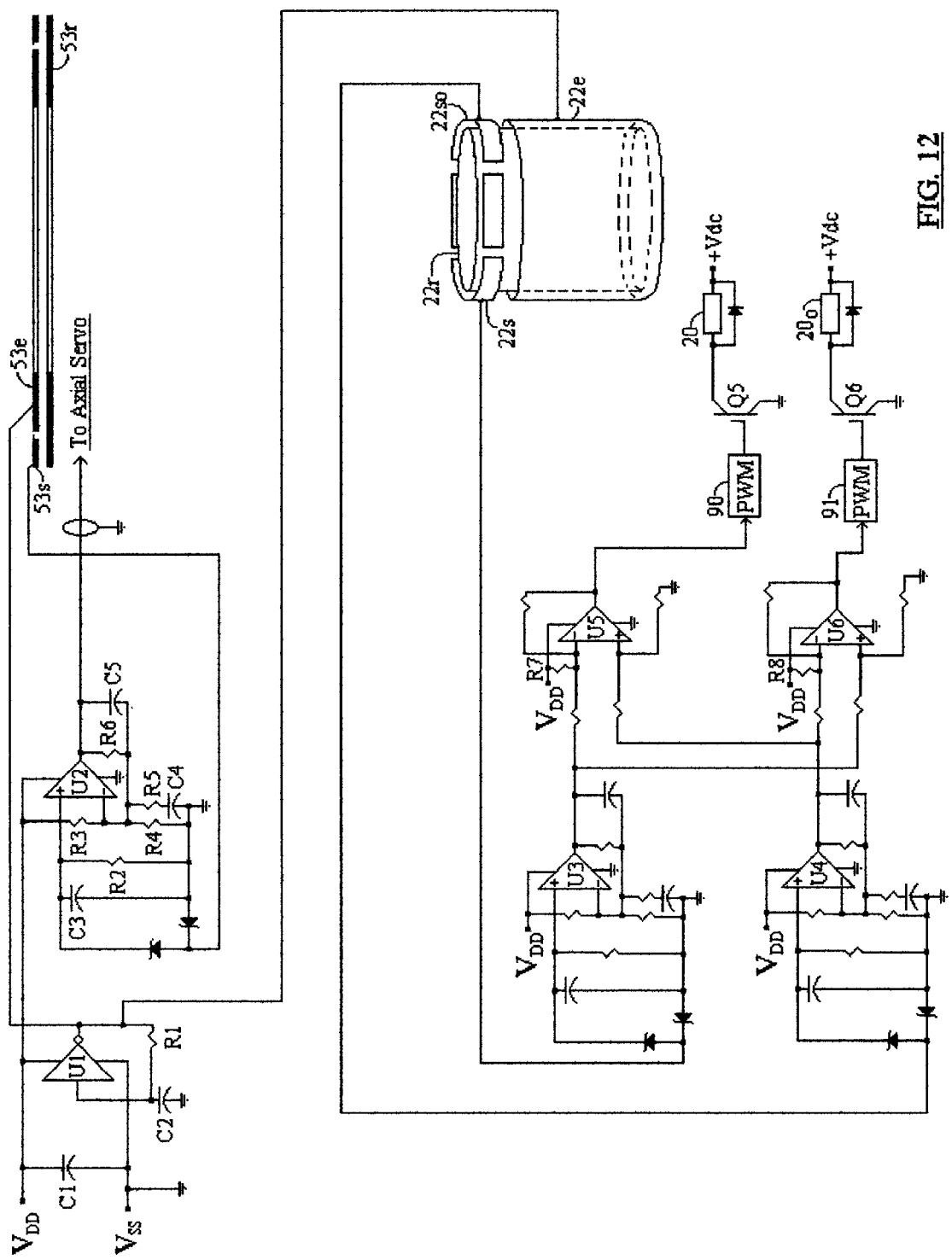
FIG. 12 illustrates capacitive axial and radial position sensors for a rotor assembly including conductive rings having low stray capacitance attached to insulated sections.

A capacitive axial and radial position sensor is set forth here, with reference to FIG. 12; wherein U1, R1, and C2 provide an essentially square-wave excitation at nominally 12 volts peak-to-peak, at a nominal 2 megahertz frequency. For axial position sensing, this excitation voltage is applied to fixed conducting exciter ring 53e, which is juxtaposed and near rotatable conducting ring 53r. The rotatable ring is attached to an insulator segment of the rotor assembly, relatively distant from other conductive material (especially components that might subject it and fixed conductive sensor ring 53s to electromagnetic interference). This arrangement detects axial position, primarily by capacitance between 53s and 53r, and secondarily by capacitance between 53e and 53r. This series capacitance is nominally several picofarads, and varies a few picofarads, with axial movement z from nominal position $z_n$. Capacitance between these adjacent fixed and rotating conductors can be computed from:

$$C = \{8.85 \times 10^{-12} \text{ (farad/meter)}\}\{\text{Area (meter}^2)\}/\{\text{Separation (meters)}\}$$

which can be combined with:

$$I = \{\text{volts peak-to-peak}\}\{\text{frequency}\}\{C\}$$

to yield rectified sensor output current:

$$I_z = \{V_{DD}\}\{\text{excitation frequency}\}\{C_n/(1-z/z_n)\}$$

where $C_n$ is nominal effective series capacitance between 53e and 53r, and 53r to 53s (and accounts for a small stray capacitance between 53r to ground), z is axial movement, and $z_n$ is nominal axial spacing between the fixed and rotatable rings.

The rectified signal is filtered by C3 and amplified by operational amplifier circuit U2, whose midband gain is (R4+R6)/R4. C4 provides rate feedback for the axial servo. C5 and R5 provide high frequency gain roll-off. R3 provides an output level adjustment. To minimize stray capacitance and signal corruption, this part of the axial servo electronics is located near fixed ring 53s. Faraday shields, to maintain signal integrity, are connected to circuit ground.

Rotatable conductive cylinder 22r is similarly attached to an insulator segment of the rotor assembly. It is capacitively coupled to excitation at a frequency of over 2 megahertz via fixed exciter cylinder 22e. Radial motion x is sensed by diametrically opposite, fixed electrodes 22s and 22so. They provide respective rectified signals:

$$I_x = \{V_{DD}\}\{\text{frequency}\}\{C_n/(1+x/x_n)\} \text{ and } I_{xo} = \{V_{DD}\}\{\text{frequency}\}\{C_n/(1-x/x_n)\}$$

These radial position signals are likewise amplified, by operational amplifier circuits U3 and U4, which likewise provide rate feedback and high-frequency roll-off. Respective U3 and U4 outputs are applied to differential amplifiers U5 and U6. Dead-band is set by R7 and R8. When dead-band is exceeded in one direction, U5 provides an output. When dead-band is exceeded in the opposite direction, U6 alternatively provides a like output. These signals are applied to respective PWM drivers 90 and 91, which control respective radial electromagnets 20 and $20_o$ through PWM power switches Q5 and Q6.

Sensor electrodes to detect radial motion 90° from that sensed by 22s and 22so are shown without associated radial servo circuits in FIG. 12 between 22s and 22so. Circuits which complete the radial servos controlling radial electromagnets aligned with these electrodes, are identical to those shown with 22s and 22so. A preferred embodiment includes four upper electromagnets with corresponding sensor electrodes and radial servos, plus four lower electromagnets with like electrodes and servo circuits. They are preferably packaged within the flywheel enclosure, with U3, U4, and the other six low-signal-level circuits packaged in close proximity to their respective sensor electrodes. The number of hermetic feed-throughs is thus minimized, by including all parts of the radial servos within the flywheel enclosure.

Figure 13:
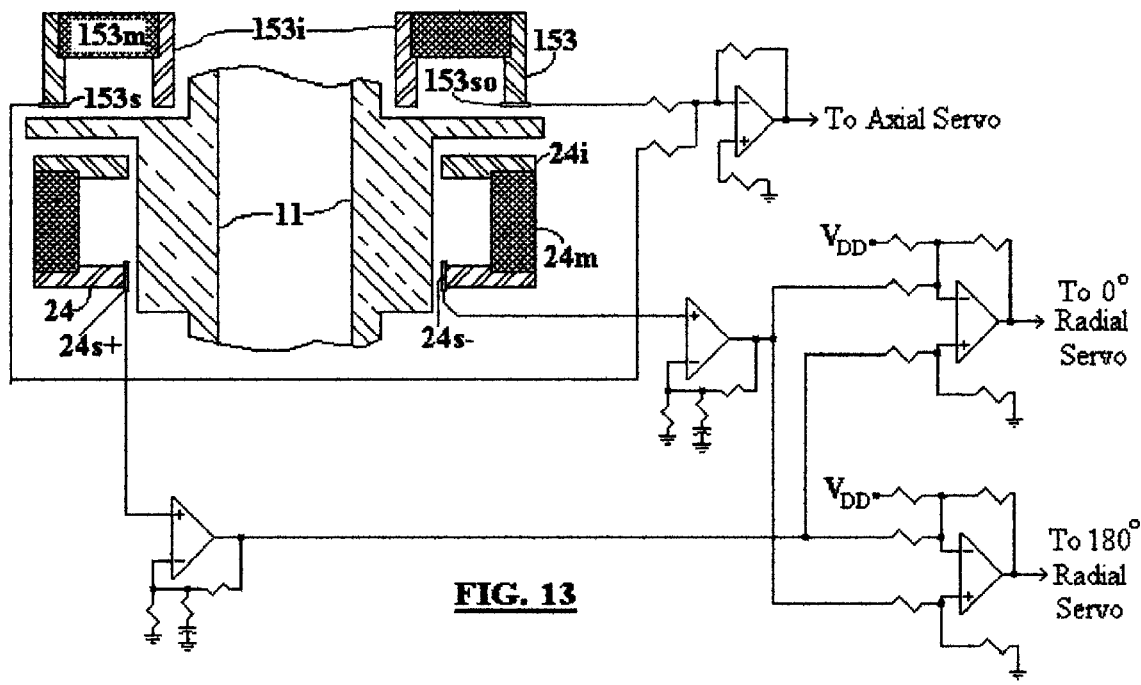
FIG. 13 illustrates one embodiment of magnetic axial and radial position sensors for a rotor assembly having high-magnetic-permeability sections.

Another axial and radial position sensor embodiment includes magnetic means. It is illustrated in FIG. 13, which shows a partial cross-section through the spin-axis, at a high-permeability section 11 of the rotor assembly. It includes one pair of sensors, 153s and 153so, 180° apart, to provide axial position feedback. Axial magnetic field B at the sensors varies with gap $S_g$ between 11 and fixed annular iron poles 153 and 153i, according to the approximate expression:

$$B=B_r(1+2S_g/w_m)$$

where $B_r$ is flux density at zero gap (known as magnet remanence or retentivity), and $w_m$ is {magnet radial width}{magnet axial width}/{pole width}. Flux is provided by annular magnet 153m, which is radially magnetized. Signals from 153s and 153so are summed by an operational amplifier circuit, to provide axial position feedback for the axial servo. Summing accommodates any lack of perpendicularity, between the spin axis and the surface of rotor assembly segment 11 adjacent to these sensors, or possible wobble, that might otherwise cause unwanted axial servo response and consequent energy dissipation.

Radial position sensing is provided by a pair of diametrically opposed magnetic sensors, 24s+ and 24s−, plus a like pair disposed 90° from them, which are not shown in this view. These sensors provide radial position signals, which vary inversely with the gaps at respective sensors, between 11 and fixed annular iron poles 24 and 24i. Radial magnetic fields are provided in these gaps by annular magnet 24m, which is axially magnetized. Flux varies at each sensor, likewise according to the expression $B=B_r/(1+2S_g/w_m)$ where $S_g$ is the gap at a particular radial sensor. Note that if the gap increases at one sensor, the gap decreases at the diametrically opposite sensor. Signals from 24s+ and 24s− are applied to a differential amplifier. This compensates for possible magnetic strength variation, that would otherwise cause centering error. Forces from the radial magnetic fields needed by magnetic radial position sensors are not negligible, and their inherent instability must be compensated by the axial magnetics and radial electromagnets. Ferromagnetic annular steel poles accommodate low cost magnets, by providing a uniform field in the gap regions, despite possible magnet defects, chips, cracks, and lack of uniform magnetic strength. This circumvents magnetic cycling of rotor assembly iron 11, which might otherwise cause idling loss. Unstable radial forces, between 11 and the fixed magnetic materials 24, 24i and 24m, can be small compared to nominal radial forces of the magnetic bearing, with small low-intensity magnetic sensor components. Note that the outer diameter of rotor iron 11 extends beyond that of 153; this circumvents axial sensor sensitivity to radial motion.

Both the capacitive and magnetic position sensors set forth above have a non-linear response to rotor assembly position. Gain at small gaps can be several times higher than at large gaps. This complicates servo loop stability. But it affords an inherent opportunity to have magnetic bearings that stiffen during large excursions from nominal positions, in directions approaching possibly destructive contact between the rotor assembly and adjacent stationary parts.

Figure 14:
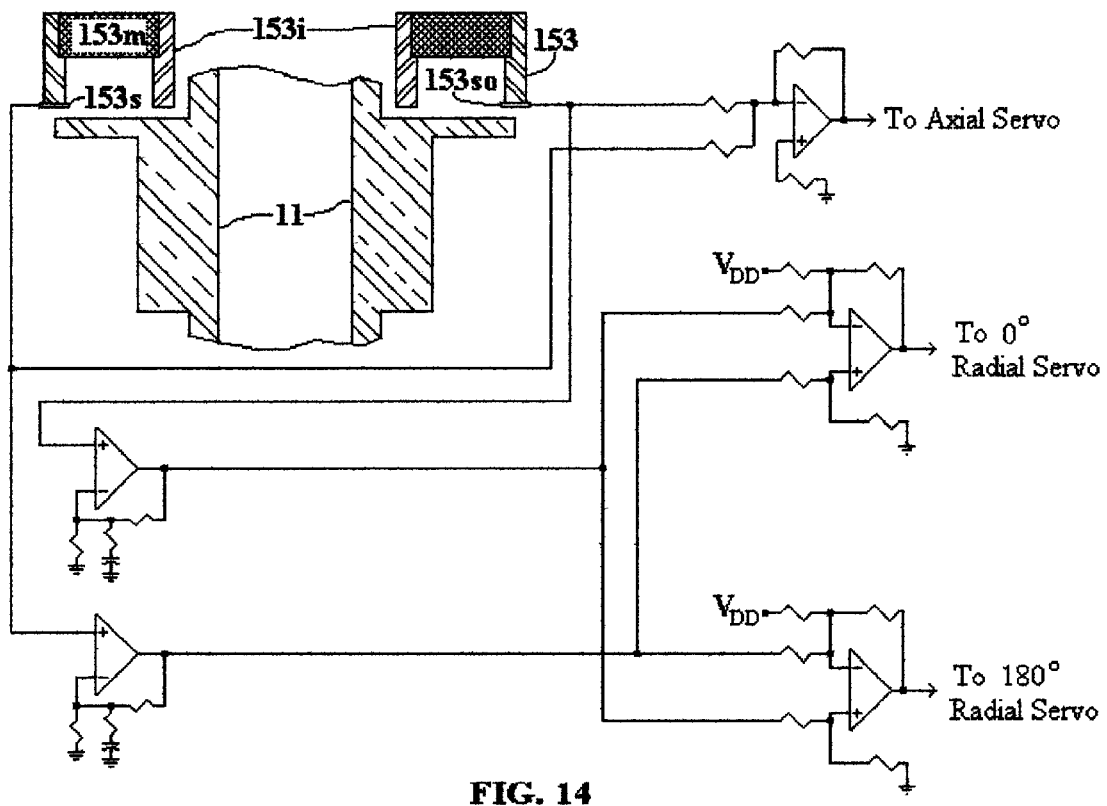
FIG. 14 illustrates an alternate embodiment of magnetic axial and radial position sensors for a rotor assembly having high-magnetic-permeability sections.

Yet another axial and radial magnetic sensor embodiment is illustrated by FIG. 14, which likewise shows a partial cross-section through the rotor spin axis. It obtains both axial and radial position signals from the same pair of sensors 153s and 153so, plus a pair disposed 90° from these, which is not shown in this view. Note that the outer circumference of 11 reaches only to the middle of the sensors. Outputs from all four sensors, in response to axial motion, vary substantially together. Outputs from respective sensors 180° apart, in response to radial motion parallel to a line between them, vary in opposition to each other (i.e., one output decreases while the other increases). To the extent that radial excursions of 11 are small, the amount one output decreases will equal the amount which the opposite output increases. Thus the sum of the outputs, and their rate of change, should not vary significantly from such radial excursions. With this sum fed to the other components of the axial servo, any sensitivity to radial excursions (herein termed cross-talk) would interfere with the axial servo loop. Likewise, any differences in respective sensor outputs, arising from axial excursions, would interfere with the radial servo loops. Such cross-talk does not significantly degrade magnetic bearing performance, during normal operation, for the stationary vertical-axis flywheel battery installations of this invention.

Accordingly, the four sensor outputs of FIG. 14 are summed, to provide axial position feedback for the axial servo. For the radial servos, sensor outputs from each pair are fed to corresponding operational amplifier circuits, which derive rate by a configuration essentially identical to that described for the capacitive sensors illustrated by FIG. 12. Output from the operational amplifiers of FIG. 14 is likewise applied to two differential amplifiers, which cancel signal components due to axial motion and add dead-band. Their outputs are fed to the radial servo circuits, which control a pair of opposing radial electromagnets. These components are essentially identical to those described in more detail for the capacitive position sensors illustrated in FIG. 12. However, the FIG. 14 embodiment results in axial and radial position sensors having far higher cross-talk, between axial and radial servos, compared to FIG. 12 and FIG. 13. Nevertheless, it needs less parts (except for servo circuits, which are the same), and will thus cost less. And need to circumvent radial force instability of the FIG. 14 embodiment, is considerably less than that of FIG. 13.

Capacitive axial and radial position sensing, from four sensors, 90° apart, similar to 22s and 22so shown in FIG. 12, is analogous to that of the magnetic sensors in FIG. 14. The rotatable conductor 22r would need to have a conical form near the sensors, and the sensors would need to be accordingly inclined, to achieve requisite axial sensitivity. However, servo circuits remain the same as those in FIG. 12, cost is comparable, and cross-talk is far more troublesome. So separate capacitive sensors, as in FIG. 12, are preferred for this invention.

An alternate embodiment, of the axial and radial position sensors, includes the capacitive radial sensors shown in FIG. 12 near the top of the rotor assembly, plus the magnetic axial and radial sensors shown in FIG. 14 near the bottom. This takes advantage of the lighter weight capacitive sensors at the top, and their immunity to stray magnetic fields (which are higher near the top). By placing the heavier, iron-dependent, magnetic sensors near the bottom, a lower center-of-gravity is facilitated, and their susceptibility to stray magnetic fields is not so troublesome, because stray magnetic fields are minimal near the bottom of the rotor assembly. Nevertheless, capacitive position sensing (with its negligible forces) is preferred over magnetic.

High and sustained electromagnet activity, excluding that required to damp normally slight vibration at certain resonant frequencies, may indicate incipient rim failure. It may also indicate effects of abnormal seismic activity. In either case, discriminators having over-ride control of electronics which control the motor/generator and backup bearings, can inhibit motor/generator drive whenever any of the servo drive levels exceed a prescribed maximum over a prescribed time interval, to help prevent flywheel damage and possible explosion.

It will be appreciated that the motor/generator and integral magnetic bearings of this invention would also provide benefits, in addition to those described herein for flywheel batteries, to other applications.

One such application would be as a vertical-spin-axis turn-table for a large data storage and retrieval system, where continuous and reliable operation is crucial. If data is stored on magnetic media, it is expected that magnetic shielding may be added, so that the strong fields needed for motor and magnetic bearing functions do not contaminate data. Another use would be as an integral vertical-spin-axis high-speed pump or turbine, for fluids or gases that are incompatible with conventional mechanical bearing lubricants.

Flywheel battery backup bearings (23, 23a, 25, and 25a in FIG. 2) will engage only when the flywheel is not in service, or upon possible electronics failure or disconnect as described above, to restrict axial and radial flywheel motion and so avoid flywheel damage.

Clearance between the rotor spindle and backup bearing contact surfaces should be smaller than distances between a nominally centered rotor assembly and any other stationary part. When the flywheel assembly is in contact with either the upper or lower backup bearing, pressure on the contact surfaces is mainly due to the rotor assembly weight minus lift from the axial levitation means, plus abnormal external acceleration. Cushioning provided by an annular spring, preferably on the rotor spindle, can absorb shock and reduce impact forces. Contact surfaces, that accommodate rotor spin by sliding, preferably have large contact areas, to reduce contact pressure and to provide high thermal conduction, in a direct and large area path as is practical, to the flywheel enclosure. The most simple and lowest cost embodiment of the invention has journal backup bearings with beveled sliding contact surfaces, such as 23 and 25. They limit axial and radial flywheel excursions, and do not include ball bearings 23a and 25a, the motors 26 and 28, nor their drive mechanisms (such as element 27), shown in FIG. 2.

Rolling contact bearings, with rolling separators between ball or roller bearings, instead of conventional sliding retainers (also known as cages), and instead of journal bearings with sliding load-bearing surfaces, would depend far less upon lubrication. However, they are not widely manufactured and distributed, mainly due to manufacturing difficulties.

According to the prior art, rolling contact bearings confront manufacturing problems, due to difficult assembly and need for close dimensional tolerance. Improvements to circumvent these problems are set forth herein with reference to FIG. 7 and FIG. 8.

These improvements should facilitate production assembly processes, permit less stringent dimensional tolerances, and provide rolling contact between load-bearing balls and separators that is not intermittent. It also permits rolling separators and related elements of this invention to be substituted directly for sliding cages of conventional ball bearings.

Figure 7:
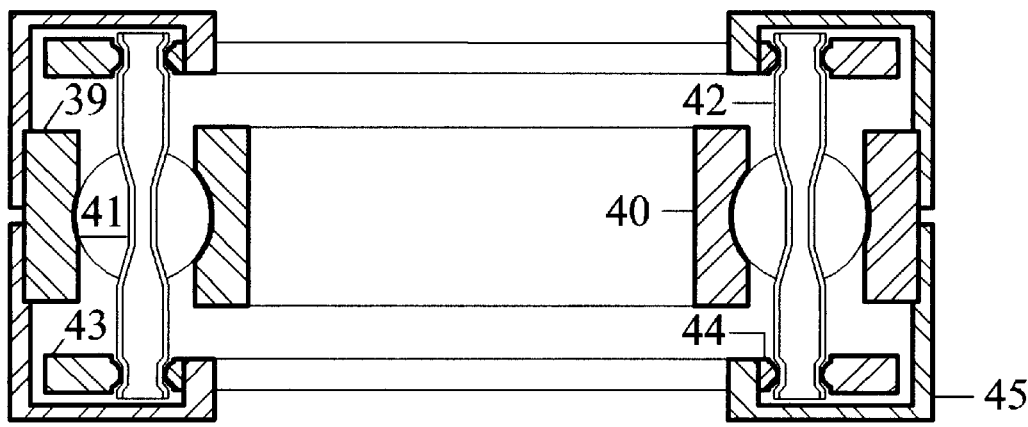
FIG. 7 illustrates a cross-sectional view through the spin axis of a rolling contact bearing having rolling separators.
Figure 8:
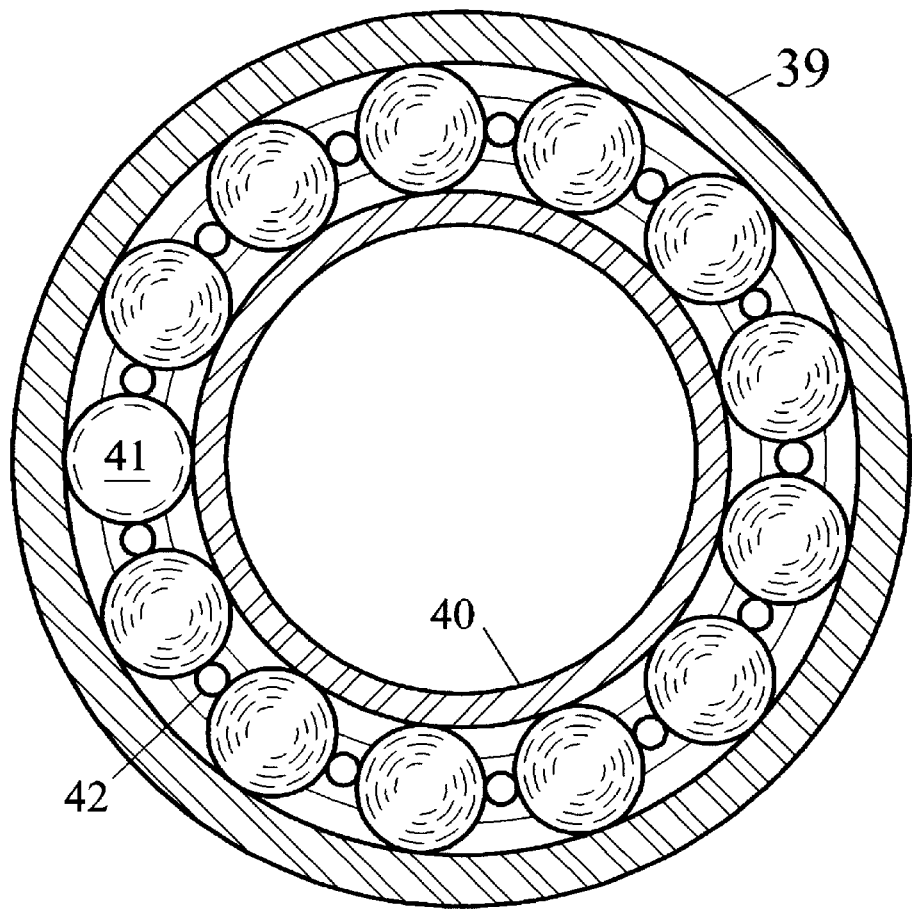
FIG. 8 illustrates an axial cross-sectional view through the rolling contact bearing.

FIG. 7 illustrates a cross-sectional view, through its spin-axis, of a preferred embodiment of the improved rolling contact mechanical bearing. FIG. 8 illustrates an axial cross-sectional view, in a plane perpendicular to the spin-axis, of the improved bearing.

Conventional inner bearing race 40 has an inner diameter intended for standard shaft attachment. Its outer diameter has an annular groove recess to provide a raceway for a plurality of ball bearings 41 each having equal radii smaller than the curvature of the raceway, to remain centered with the raceway and maintain essentially point contact while rolling thereon.

Outer bearing race 39 likewise provides a rolling surface for the ball bearings. Separator rollers 42 are interposed between each ball, to maintain equal spacing between balls and prevent scraping between otherwise adjacent surfaces which move in opposite directions. The separator rollers spin in rolling contact with the balls. The separators are necked at their axial centers, with a neck radius larger than the ball radius, to remain centered axially and to maintain essentially point contact while rolling therewith, along a contact circumference of the separator at its center.

The separators are restrained from moving radially outward of the bearing axis by outer idler race 43, which provides a rolling surface that makes contact with the separator along a recessed neck circumference centered therewith. The separators are restrained from moving inward by inner idler race 44, which makes rolling contact with the same recessed neck circumference.

Kinematic analysis shows that, if the separators are located along the same bolt circle as the center of each ball, and that if the separator neck in contact with the balls has the same diameter as the neck in contact with the idlers, inner idler race 44 will not rotate relative to the bearing outer race.

Likewise, if the separator centers are each located on straight lines connecting the centers of adjacent balls, and the separator neck in contact with the idlers is equal to the neck in contact with the balls multiplied by the factor cos(180°/(number of balls)), the inner idler race will not rotate relative to the bearing outer race.

The inner idler race diameter would then equal:

{inner bearing race diameter+ball diameter} {cos(180°/(number of balls))}−{separator neck diameter contacting the idlers}.

And the outer idler race diameter would equal:

{inner idler race diameter}+(2){separator neck diameter contacting the idlers}.

This is the preferred embodiment, because there is no outward thrust on the separators due to contact with the balls, and ball separation can be maintained with minimum contact forces between the balls and the separators. Insofar as the inner bearing race spins, separator skew will tend to be corrected by gyroscopic precession torque, acting on the separators at their high spin rates. Separator precession is zero when its spin axis is parallel to the bearing spin axis.

Since the inner idler race does not need to rotate relative to the outer bearing race, it can be in contact with cover 45, which is affixed to the outer bearing race. Cover 45 is preferably a metal and is radially rigid to stiffen the inner idler. Its radial stiffness permits the inner idler to be a relatively thin, radially compliant and elastic ring, to facilitate its assembly with the separators, outer idler, and ball bearings.

To further facilitate assembly, the inner idler can be made even more compliant radially, by having equally spaced axial grooves in its inner circumference, spaced to have several grooves distributed evenly within an angle of 360°/(number of balls). Mechanized assembly is thereby facilitated, that is far easier and less costly than assembly of rolling contact bearings of the prior art. Added parts and processes will increase cost only slightly over conventional ball bearings.

Hollow thin-wall separators fabricated from annealed spring steel tubing that is then necked by a metal spinning process, then heat treated to extend its elastic deformation range, allows the separators to be more easily assembled with the ball bearing while maintaining a zero or very small clearance for the assembly. Solid materials used in the prior art require much closer dimensional control, and do not facilitate practical assembly of separators designed for zero or very small clearance fit.

The outer idler race spins at a high speed, and therefore is subjected to centrifugal forces due to its own mass. The hollow thin-wall separators that it also supports against centrifugal forces will subject outer idlers to forces lower than heavier solid members used in the prior art.

Another advantage of thin-wall separators, fabricated from material operating well within its elastic limit, is their low strain in this separator implementation. Both these factors combine to result in extremely low rolling loss from mechanical hysteresis. Metals are preferable to plastic, which has lower thermal conductivity and will outgas far more than metals. Plastic also has high rolling loss due to mechanical hysteresis. Local heat buildup can be destructive if backup bearings are engaged in the event of a prolonged abnormal condition, with the flywheel spinning at maximum speed. The idler races and cover on the opposite side of the bearing illustrated in FIG. 7 can be identical to those described above.

It will be appreciated that the rolling contact bearings of the present invention would also have advantages for other applications. Such applications include all low-loss bearings, to support rotatable shafts, for uses and environments not compatible with bearing lubricants.

Lower cost would be facilitated, by backup bearings having sliding surfaces, provided only by beveled contact surfaces 23 and 25 except they would preferably be broader than illustrated in FIG. 2, at the top and bottom of the rotor assembly. Increased surface area would result in lower contact pressure and higher thermal conductivity where heat is generated. Also, in this embodiment, non-rotating parts of the backup bearing would be affixed to the enclosure by material with high thermal conductivity so as to provide maximum heat transfer.

With zero maintenance and long life, which should result from the improvements provided by this invention, underground installation would be practical. The flywheel assembly enclosure is preferably mounted with 2-axis gimbals (90° apart) supporting it from its top, the gimbals on a stand supported by the base of a frangible rigid liner, resting on leveled sand fill.

The gimbals constrain the enclosure so that it does not rotate due to reaction from stator torque, and inherently maintain the enclosure verticality by gravity alone. Thus, verticality will be maintained, even if the sand or the earth below it were to shift from its initial leveling. The stand and liner base will preferably have protrusions, which prevent turning, which could otherwise result from torque between the motor/generator rotor and stator, or between a possible disintegrating flywheel and its enclosure.

The preferred flywheel enclosure installation site is in a cylindrical hole prepared for this purpose. The hole will preferably be dug in a construction area planned to be covered by a reinforced concrete slab floor, for a parking or storage area, prior to pouring concrete for that area's floor. Backfill is then poured into the cylindrical hole, and compacted to support the liner, which protects and maintains a clean space for the flywheel enclosure, and conduit connecting it to wall-mounted associated electronics, in the area constructed above the floor.

The liner also facilitates installation of far more costly items (like the flywheel in its enclosure) at a later date, when they can be protected from vandalism, theft, and inadvertent damage from building construction activity. Backfill can then be poured around the liner, and the concrete slab floor poured above it, around an annular insert having a removable (with special tools) steel cover plate fastened thereto.

The backfill is preferably a porous sand mixture, which is readily available at construction sites, is low cost, is not flammable, not degradable, and can absorb an explosive blast without a high pressure reflected shock wave. The concrete slab, and the cover plate over the flywheel enclosure, should provide an effective barrier, to protect people in and around the building, and prevent damage to the building in the event of a possible exploding flywheel.

Associated electronics, connected to the flywheel enclosure by an electrical conduit having protective metal armor around it, is preferably housed in a single wall-mounted cabinet. This provides convenient access for viewing its data monitor at the cabinet front, and for setting command variables like startup, shutdown, time-of-day power storage, power-down, and possible power schedules for discretionary loads. It also provides a clear air flow path, to cool electronics in the cabinet.

Installed as set forth hereabove, the flywheel enclosure need not be capable of containing a possible flywheel explosion. The enclosure is preferably constructed of light thin-wall metal, such as aluminum, mainly because it will outgas far less than many other materials, can be fabricated to high precision tolerances, and can withstand possible bumping and scraping during assembly and handling procedures without damaging its structural or interior vacuum integrity. A preferred embodiment will contain absorptive and adsorptive getters in the enclosure, to help maintain its interior vacuum. A small vacuum pump, responsive to a vacuum sensor or to idling loss, can be added, to automatically prevent long-term vacuum loss.

It will be appreciated that this invention may have many other variations in addition to those described by example herein, with appropriate embodiments of constituent elements herein described to best suit a particular situation. Accordingly, it is intended that the claims as set forth hereinafter cover all such applications, embodiments, and variations thereto within the true spirit and scope of this invention.

I claim as new and a significant improvement to the prior art, and desire to secure by Letters Patent:

1. A flywheel battery, for storing electric power as kinetic energy from a dc power buss and returning power to said buss with minimal losses, comprising:

motor/generator means, including polyphase stator windings for conducting polyphase sinusoidal currents, which are formed from multi-strand insulated conductors for eddy blocking and bucking, a permanent-magnet rotor for providing radial flux that interacts with said currents, and rotor angle sensors, for providing polyphase feedback signals which vary essentially sinusoidally with rotor angle;

a flywheel rim, for providing rotary inertia for storing said kinetic energy, attached to said motor/generator rotor and concentric therewith, the combination having a vertical spin axis;

power interface electronics, connected to said dc power buss and to said polyphase stator windings of said motor/generator, said electronics responsive to the rotor angle sensors and to the buss voltage, for controlling polyphase current through said stator windings so its resultant magnetic field rotates synchronously with said rotor, axial servo means, including axial position sensors, also including annular permanent-magnet and magnetic materials for producing concentric annular poles above the rotor and flywheel, for providing axial force with minimal magnetic cycling, for levitating the rotor and flywheel and for passive radial centering, including a concentric coil between said poles, its bi-directional current controlled by an axial servo loop responsive to said axial position sensors, for stabilizing the axial force, including a current integrator, for adjusting axial position to reach zero steady-state current;

radial servo means, including radial position sensors at the rotor top and bottom, including radial electromagnets aligned thereto, for radially centering the rotor by forces from magnetic fields with flux paths substantially radial and axial in cooperating rotor magnetic material, controlled by radial servo loops responsive to said radial position sensors and having dead-band means wherein centering is maintained by said passive radial centering, gravity, and gyrodynamics.

2. The flywheel battery of claim 1, including mechanical backup bearings, near the top and bottom of the rotor and flywheel assembly, and normally not in contact with it, for supporting the rotatable assembly when said axial and radial servo means are not operating, and further including:

at least one backup bearing actuation motor, for engaging and disengaging the backup bearing contact surfaces and cooperative rotatable mechanical bearing surfaces;

a jack-screw mechanism, driven by said actuation motor, for axially positioning said contact surfaces.

3. The flywheel battery of claim 2, further including a signal discriminator, having vibration discriminator means, responsive to signals from said axial and radial servo loops, for providing override signals to the power interface electronics and drive signals to said actuation motor.

4. The motor/generator of claim 1, including:

polyphase stator windings, having multi-strand insulated conductors formed for blocking and bucking eddy currents therein, embedded in a non-magnetic cylinder affixed to the enclosure, to conduct polyphase currents varying sinusoidally with rotor angle so the resulting stator field is synchronized to rotor angle, for producing torque between the rotor and the stator, and for exchanging electric power with the power interface electronics while incurring minimal hysteresis and eddy losses;

rotor angle sensor means, for providing polyphase feedback signals which vary essentially sinusoidally with rotor angle;

at least one pair of rotor magnets, with one magnet of the pair magnetized radially outward and the other magnetized radially inward, to provide radial flux, which varies essentially sinusoidally with rotor angle, through the stator windings;

an outer cylinder of high-permeability steel, for supporting the magnets therein and for providing an outer flux path;

an inner cylinder of high-permeability steel, attached to the outer cylinder, for providing an inner flux path, and for completing through the stator windings a flux pattern which rotates with the rotor.

5. The power interface electronics of claim 1, comprising:

signal processing means, responsive to the rotor angle sensors, the dc power buss voltage, and to input commands, for controlling PWM H-bridges;

PWM H-bridges, responsive to the signal processing means, connected, with parallel capacitors, across the dc power buss, and through series output inductors to respective stator windings, for controlling sinusoidal polyphase currents through the stator windings, and for exchanging dc current with the dc power buss.

6. The axial servo means of claim 1, comprising:

a fixed annular permanent-magnet, a high-permeability annular inner pole, and a high-permeability annular outer pole, above the rotor and flywheel, to provide an axial magnetic field uniform with rotor angle in an annular gap region, for levitating and passively centering the rotor and flywheel;

a fixed annular concentric coil affixed to the permanent-magnet and high-permeability poles, for adjusting and stabilizing the magnetic field in the annular gap region;

rotatable annular high-permeability poles, attached to the rotor and flywheel near its top, and juxtaposed beneath the fixed poles and concentric coil, to provide axial lift and passive radial centering forces, for the rotor and flywheel;

axial position sensors, for detecting the rotor and flywheel assembly axial position;

axial servo loop means, responsive to the axial position sensors, for controlling current through the concentric coil, to stabilize and adjust axial position of the rotor and flywheel;

integrator means, responsive to the concentric coil current, for adjusting axial position of the rotor and flywheel, so that longterm coil current is reduced to nearly zero.

7. The axial servo means of claim 1, including:

a fixed annular permanent-magnet, a high-permeability annular inner pole, and a high-permeability annular outer pole with outer diameter at the pole gap smaller than the outer diameter of the permanent-magnet, above the rotor and flywheel, to provide a concentrated axial magnetic field uniform with rotor angle in an annular gap region, for levitating and passively centering the rotor and flywheel;

a fixed annular concentric coil, affixed to the permanent-magnet and high-permeability poles, for adjusting and stabilizing the magnetic field in the annular gap region;

rotatable annular high-permeability poles, attached to the rotor and flywheel near its top, and juxtaposed beneath the fixed poles and concentric coil to provide axial lift and passive radial centering forces, for the rotor and flywheel;

axial position sensors, for detecting the rotor and flywheel assembly axial position;

axial servo loop means, responsive to the axial position sensors, for controlling current through the concentric coil, to stabilize and adjust axial position of the rotor and flywheel;

integrator means, responsive to the concentric coil current, for adjusting axial position of the rotor and flywheel, so that long-term coil current is reduced to nearly zero.

8. The radial servo means of claim 1, including:

at least three radial electromagnets near the top, and at least three near the bottom, of the rotor and flywheel assembly, fixed to the flywheel enclosure, each including a coil around high-permeability steel, its two poles in juxtaposition with the rotor to conduct a magnetic field having a substantially radial and axial path in the rotor, for providing radial attraction forces between the electromagnets and cooperating cylindrical high-permeability steel attached to and coaxial with the rotor and flywheel, with minimal flux cycling in the cooperating magnetic materials;

at least two radial position sensors near the top, and at least two near the bottom, of the rotor and flywheel assembly;

radial servo loops, responsive to the radial position sensors, for controlling current through the coils of the radial electromagnets;

dead-band means, for inhibiting said current when the flywheel assembly spin-axis is centered within tolerance and rate of radial motion is less than a prescribed level, to maintain spin-axis centering and verticality during normal operation, by said passive radial centering, gravity, and gyrodynamics.

9. Mechanical backup bearings as in claim 2, each also comprising:

a ball bearing having a fixed outer race and a rotatable inner race, and a plurality of load-bearing balls therebetween, which roll in contact with the inner and outer race;

separators between each of the balls, formed from thin-wall tubing of a spring material, each having a neck at its center to maintain axial centering and rolling contact with two balls, and having necks near both of its ends for rolling contact with idler races;

outer idler races at both sides of the bearing, to provide outer raceways for the necks of each separator near their respective ends;

inner idler races at both sides of the bearing, to provide inner raceways for the necks of each separator near their respective ends;

a cover at each side of the bearing, each having a radially rigid inner shoulder to radially stiffen the adjoining inner idler race;

means for affixing the covers to the outer race of the ball bearing.

10. The polyphase stator windings in claim 1, each comprising:

a group of conductor strands, each insulated from the other, formed in their inactive region between their two straight axial active segments, so as to interchange strands about the group center, to equalize, between winding terminal connections, back-emf of each strand.

11. The polyphase stator windings in claim 1, each comprising:

a group of conductor stands, each insulated from the others between winding terminal connections, the group spiraled, to equalize, between winding terminal connections, back-emf of each strand.

12. The axial position sensor in claim 1, comprising:

high-frequency oscillator means, to supply an excitation voltage;

a fixed conductive exciter ring, connected to the excitation voltage;

a rotatable conductive ring, attached to the rotor assembly by means of an insulating annular member and having a surface capacitively coupled to the exciter ring;

a fixed conductive sensor ring, capacitively coupled to the rotatable ring, for providing a signal responsive to capacitance between the sensor ring and rotatable ring;

current rectifier and filter means, for removing the high-frequency component from the signal provided by the sensor ring;

operational amplifier means, for providing feedback to the axial servo means, responsive to the rotor assembly axial position and excursion rate.

13. The radial position sensors in claim 1, each comprising:

high-frequency oscillator means, to supply an excitation voltage;

a fixed conductive exciter cylinder, connected to the excitation voltage;

a rotatable conductive cylinder, attached to the rotor assembly by means of an insulating annular member, and having a surface capacitively coupled to the exciter cylinder;

four fixed sensor electrodes, 90° apart, capacitively coupled to the rotatable cylinder, for providing two signal pairs, responsive to capacitances between opposing electrodes and the rotatable cylinder, current rectifier and filter means, connected to respective sensor electrodes, for removing the high-frequency component from signals provided by the sensor electrodes;

operational amplifier means, for providing two amplified signal pairs, responsive to the rotor assembly radial position and excursion rate;

differential amplifier means, for providing pairs of outputs, with dead-band, to respective radial servos, proportional to the difference between said amplified signal pairs.

14. The axial position sensor of claim 1, comprising:

fixed annular permanent magnet means, with affixed inner and outer high-permeability annular poles, for providing an axial magnetic field;

a rotatable high-permeability annular section of the rotor assembly, having a flat shoulder near the annular poles, to complete a path for the magnetic field varying with axial position;

a pair of magnetic intensity sensors 180° apart, affixed to one annular pole, for providing a pair of sensor outputs responsive to the axial magnetic field in the gap between the annular pole and the rotatable annular section;

operational amplifier means, for providing feedback to the axial servo, proportional to the sum of the sensor outputs plus their rates of change.

15. The radial position sensors of claim 1, each comprising:

fixed annular permanent magnet means, with affixed upper and lower high-permeability annular poles, for providing a radial magnetic field;

a rotatable high-permeability annular section of the rotor assembly, having an outer surface near the annular poles, to complete a path for the magnetic field;

four magnetic intensity sensors, 90° apart, affixed to one annular pole in the gap between the pole and the rotatable annular section, and each providing an output signal responsive to the radial magnetic field at its respective location;

operational amplifier means, for providing two signal output pairs, which vary with opposite magnetic sensor output amplitude and rate of change;

differential amplifier means, for providing pairs of outputs, with dead-band, to respective radial servos, proportional to the difference between the signal output pairs.

16. The motor/generator of claim 1, including:

polyphase stator windings, having multi-strand insulated conductors formed for blocking and bucking eddy currents therein, embedded in a non-magnetic cylinder affixed to the enclosure, to conduct polyphase currents varying sinusoidally with rotor angle so the resulting stator field is synchronized to rotor angle, for producing torque between the rotor and the stator, and for exchanging electric power with the power interface electronics while incurring minimal hysteresis and eddy losses;

at least one pair of rotor magnets, with one magnet of the pair magnetized radially outward and the other magnetized radially inward, to provide radial flux, which varies essentially sinusoidally with rotor angle, through the stator windings;

rotor angle sensor means, responsive to said radial flux, for providing polyphase feedback signals which vary essentially sinusoidally with rotor angle;

an outer cylinder of high-permeability steel, for supporting the magnets therein and for providing an outer flux path;

an inner cylinder of high-permeability steel, attached to the outer cylinder, for providing an inner flux path, and for completing through the stator windings a flux pattern which rotates with the rotor.

17. The motor/generator of claim 1, including:

polyphase stator windings, having multi-strand insulated conductors formed for blocking and bucking eddy currents therein, embedded in a non-magnetic cylinder affixed to the enclosure, to conduct polyphase currents varying sinusoidally with rotor angle so the resulting stator field is synchronized to rotor angle, for producing torque between the rotor and the stator, and for exchanging electric power with the power interface electronics while incurring minimal hysteresis and eddy losses;

rotor angle sensor means, for providing polyphase feedback signals which vary essentially sinusoidally with rotor angle;

at least one pair of a rotor magnet group each composed of three magnets, wherein the middle magnet of the group is stronger than the other two, with one group magnetized radially outward and the other group magnetized radially inward, to provide radial flux, which varies essentially sinusoidally with rotor angle, through the stator windings;

an outer cylinder of high-permeability steel, for supporting the magnets therein and for providing an outer flux path;

an inner cylinder of high-permeability steel, attached to the outer cylinder, for providing an inner flux path, and for completing through the stator windings a flux pattern which rotates with the rotor.

18. The flywheel battery of claim 1, further including a vacuum enclosure, containing therein said motor/generator, flywheel rim, and axial and radial servo means, and having hermetic connections to power interface electronics outside the enclosure.

19. The flywheel battery of claim 3, further including a vacuum enclosure, containing therein said motor/generator, flywheel rim, axial and radial servo means, mechanical backup bearings, and having hermetic connections to power interface electronics outside the enclosure.

20. A flywheel battery, for storing electric power as kinetic energy from a dc power buss and returning power to said buss with minimal losses, comprising:

power interface electronics, connected to said buss and to polyphase stator windings of a motor/generator, said electronics responsive to rotor angle sensors, to the buss voltage, and to override signals from a signal discriminator, for controlling polyphase current through said stator windings so its resultant magnetic field rotates synchronously with said rotor, a flywheel rim, attached to said rotor and coaxial therewith, having a vertical spin axis, for providing rotary inertia for storing said kinetic energy;

said motor/generator, for converting power with minimal magnetic cycling of magnetic materials and minimal eddy losses in conductors, having polyphase stator windings formed from multi-strand insulated conductors for eddy blocking and bucking, a permanent-magnet rotor for providing radial flux, and said rotor angle sensors, for providing polyphase feedback signals which vary essentially sinusoidally with rotor angle;

axial servo means, responsive to axial position sensors, including annular permanent-magnet and magnetic materials for producing concentric annular poles above the rotor and flywheel for providing axial force with minimal magnetic cycling, for levitating the rotor and flywheel and for passive radial centering, including a concentric coil between said poles, its bidirectional current controlled by an axial servo loop, for stabilizing the axial force, including a current integrator, for adjusting axial position to reach zero steady-state current;

radial servo means, responsive to radial position sensors at the rotor top and bottom, including radial electromagnets aligned thereto, for radially centering the rotor by forces from magnetic fields with flux paths substantially radial and axial in the rotor, controlled by radial servo loops having deadband means wherein centering is maintained by said passive radial centering, gravity, and gyrodynamics;

said signal discriminator, including vibration discriminator means, responsive to signals from said axial and radial servo loops, for providing override signals to the power interface electronics;

mechanical backup bearings, near the top and bottom of the rotor, and normally not in contact with it, for supporting the rotor when said axial and radial servo means are not operating;

a vacuum enclosure, containing therein said motor/generator, flywheel rim, axial and radial servo means, and mechanical backup bearings, and having hermetic connections to power interface electronics outside the enclosure.

21. The power interface electronics in claim 20, comprising:

signal processing means, responsive to the rotor angle sensors, the dc power buss voltage, to the vibration discriminator, and to input commands, for controlling PWM H-bridges;

PWM H-bridges, responsive to the signal processing means, connected, with parallel capacitors, across the dc power buss, and through series output inductors to respective stator windings, for controlling sinusoidal polyphase currents through the stator windings, and for exchanging dc current with the dc power buss.

22. The motor/generator of claim 20, including:

polyphase stator windings, having multi-strand insulated conductors formed for blocking and bucking eddy currents therein, embedded in a non-magnetic cylinder affixed to the enclosure, to conduct polyphase currents varying sinusoidally with rotor angle so the resulting stator field is synchronized to rotor angle, for producing torque between the rotor and the stator, and for exchanging electric power with the power interface electronics while incurring minimal hysteresis and eddy losses;

rotor angle sensor means, for providing polyphase feedback signals which vary essentially sinusoidally with rotor angle;

at least one pair of rotor magnets, with one magnet of the pair magnetized radially outward and the other magnetized radially inward, to provide radial flux, which varies essentially sinusoidally with rotor angle, through the stator windings;

an outer cylinder of high-permeability steel, for supporting the magnets therein and for providing an outer flux path;

an inner cylinder of high-permeability steel, attached to the outer cylinder, for providing an inner flux path, and for completing through the stator windings a flux pattern which rotates with the rotor.

23. The axial servo means in claim 20, comprising:

a fixed annular permanent-magnet, with high-permeability annular steel poles, above the rotor and flywheel, within and supported by the vacuum enclosure, to provide an axial magnetic field uniform with rotor angle in an annular gap region, for levitating the rotor and flywheel;

a fixed, annular, concentric coil, affixed to the permanent-magnet and steel poles, for adjusting and stabilizing the magnetic field in the annular gap region;

rotatable annular high-permeability steel poles, attached to the rotor and flywheel near its top, and juxtaposed beneath the fixed permanent-magnet, poles, and concentric coil, to provide axial lift and radial centering forces, for the rotor and flywheel;

axial position sensors, for detecting the rotor and flywheel assembly axial position;

axial servo means, responsive to the axial position sensors, for controlling current through the concentric coil, to stabilize and adjust axial position of the rotor and flywheel;

integrator means, responsive to the concentric coil current, for adjusting axial position of the rotor and flywheel, so that long-term coil current is reduced to nearly zero.

24. The radial servo means of claim 20, including:

at least three radial electromagnets near the top, and at least three near the bottom, of the rotor and flywheel assembly, fixed to the flywheel enclosure, each including a coil around high-permeability steel, its two poles in juxtaposition with the rotor to conduct a magnetic field having a substantially radial and axial path in the rotor, for providing radial attraction forces between the electromagnets and cooperating cylindrical high-permeability steel attached to and coaxial with the rotor and flywheel, with minimal flux cycling in the cooperating magnetic materials;

at least two radial position sensors near the top, and at least two near the bottom, of the rotor and flywheel assembly;

radial servo loops, responsive to the radial position sensors, for controlling current through the coils of the radial electromagnets;

dead-band means, for inhibiting said current when the flywheel assembly spin-axis is centered within tolerance and rate of radial motion is less than a prescribed level, to maintain spin-axis centering and verticality during normal operation, by said passive radial centering, gravity, and gyrodynamics.

25. Mechanical backup bearings as in claim 20, each also comprising:

a ball bearing having a fixed outer race and a rotatable inner race, and a plurality of load-bearing balls therebetween, which roll in contact with the inner and outer race;

separators between each of the balls, formed from thin-wall tubing of a spring material, each having a neck at its center to maintain axial centering and rolling contact with two balls, and having necks near both of its ends for rolling contact with idler races;

outer idler races at both sides of the bearing, to provide outer raceways for the necks of each separator near their respective ends;

inner idler races at both sides of the bearing, to provide inner raceways for the necks of each separator near their respective ends;

a cover at each side of the bearing, each having a radially rigid inner shoulder to radially stiffen the adjoining inner idler race;

means for affixing the covers to the outer race of the ball bearing.

26. The polyphase stator windings in claim 22, each comprising:

a group of conductor strands, each insulated from the other, formed in their inactive region between their two straight axial active segments, so as to interchange strands about the group center, to equalize, between winding terminal connections, back-emf of each strand.

27. The polyphase stator windings in claim 22, each comprising:

a group of conductor strands, each insulated from the others between winding terminal connections, the group spiraled, to equalize, between winding terminal connections, back-emf of each strand.

28. Vibration discriminator means, as in claim 20, responsive to position and rate signals from the axial servo and the plurality of radial servos, comprising:

signal processing means, responsive to the servo signals, for providing override signals to the power interface electronics, for inhibiting speed increase of the motor/generator;

an output for providing motor drive, to engage and disengage the backup bearings.

29. The axial position sensor in claim 20, comprising:

high-frequency oscillator means, to supply an excitation voltage;

a fixed conductive exciter ring, connected to the excitation voltage;

a rotatable conductive ring, attached to the rotor assembly by means of an insulating annular member and having a source capacitively coupled to the exciter ring;

a fixed conductive sensor ring, capacitively coupled to the rotatable ring, for providing a signal responsive to capacitance between the sensor ring and rotatable ring;

current rectifier and filter means, for removing the high-frequency component from the signal provided by the sensor ring;

operational amplifier means, for providing feedback to the axial servo, responsive to the rotor assembly axial position and excursion rate.

30. The radial position sensors in claim 20, each comprising:
high-frequency oscillator means, to supply an excitation voltage;
a fixed conductive exciter cylinder, connected to the excitation voltage;
a rotatable conductive cylinder, attached to the rotor assembly by means of an insulating annular member, and having a surface capacitively coupled to the exciter cylinder;
four fixed sensor electrodes, 90° apart, capacitively coupled to the rotatable cylinder, for providing two signal pairs, responsive to capacitances between opposing electrodes and the rotatable cylinder;
current rectifier and filter means, connected to respective sensor electrodes, for removing the high-frequency component from signals provided by the sensor electrodes;
operational amplifier means, for providing two amplified signal pairs, responsive to the rotor assembly radial position and excursion rate;
differential amplifier mean, for providing pairs of outputs, with dead-band, to respective radial servos, proportional to the difference between said amplified signal pairs.

31. The axial position sensor in claim 20, comprising:
fixed annular permanent magnet means, with affixed inner and outer high-permeability annular poles, for providing an axial magnetic field;
a rotatable high-permeability annular section of the rotor assembly, having a flat shoulder near the annular poles, to complete a path for the magnetic field varying with axial position;
a pair of magnetic intensity sensors 180° apart, affixed to one annular pole, for providing a pair of sensor outputs responsive to the axial magnetic field in the gap between the annular pole and the rotatable annular section;
operational amplifier means, for providing feedback to the axial servo, proportional to the sum of the sensor outputs plus their rates of change.

32. The radial position sensors in claim 20, each comprising:
fixed annular permanent magnet means, with affixed upper and lower high-permeability annular poles, for providing a radial magnetic field;
a rotatable high-permeability annular section of the rotor assembly, having an outer surface near the annular poles, to complete a path for the magnetic field;
four magnetic intensity sensors, 90° apart, affixed to one annular pole in the gap between the pole and the rotatable annular section, and each providing an output signal responsive to the radial magnetic field at its respective location;
operational amplifier means, for providing two signal output pairs, which vary with opposite magnetic sensor output amplitude and rate of change;
differential amplifier means, for providing pairs of outputs, with dead-band, to respective radial servos, proportional to the difference between the signal output pairs.

33. Combined axial and radial position sensors as in claim 20, comprising: fixed annular permanent magnet means, with affixed inner and outer high-permeability annular poles, for providing a magnetic field;
a rotatable high-permeability annular section of the rotor assembly, having a flat shoulder of diameter approximately equal to the distance between a pair of magnetic sensors, to complete a path for the magnetic field which varies with axial and radial rotor position;
four magnetic sensors, 90° apart, affixed to the outer annular pole, for providing outputs responsive to the magnetic field in the gap between the outer pole and the rotatable annular section;
operational amplifier means, for providing feedback to the axial servo, proportional to the sum of the sensor outputs plus their rates of change;
operational amplifier circuits, for providing signals proportional to respective sensor outputs and rates of change;
differential amplifier means, responsive to said signals, for providing outputs, with dead-band, to corresponding radial servos, proportional to differences between paired signals.

34. Mechanical backup bearings as in claim 20, each also comprising:
a ball bearing having a fixed outer race and a rotatable inner race, and a plurality of load-bearing balls therebetween, which roll in contact with the inner and outer race;
separators between each of the balls, formed from thin-wall tubing of a spring material, each having a neck at its center to maintain rolling contact with two balls, and having necks near both of its ends for maintaining rolling contact with idler races;
outer idler races at both sides of the bearing, to provide outer raceways for the necks of each separator near their respective ends;
inner idler races at both sides of the bearing, to provide inner raceways for the necks of each separator near their respective ends;
a cover at each side of the bearing each having a radially rigid inner shoulder to stiffen the adjoining inner idler race;
means for affixing the covers to the outer race of the ball bearing.

35. The axial servo means of claim 20, including:
a fixed annular permanent-magnet, a high-permeability annular inner pole, and a high-permeability annular outer pole with outer diameter at the pole gap smaller than the outer diameter of the permanent-magnet, above the rotor and flywheel, to provide a concentrated axial magnetic field uniform with rotor angle in an annular gap region, for levitating and passively centering the rotor and flywheel;
a fixed annular concentric coil, affixed to the permanent-magnet and high-permeability poles, for adjusting and stabilizing the magnetic field in the annular gap region;
rotatable annular high-permeability poles, attached to the rotor and flywheel near its top, and juxtaposed beneath the fixed poles and concentric coil, to provide axial lift and passive radial centering forces, for the rotor and flywheel;
axial position sensors, for detecting the rotor and flywheel assembly axial position;
axial servo loop means, responsive to the axial position sensors, for controlling current through the concentric coil, to stabilize and adjust axial position of the rotor and flywheel;

integrator means, responsive to the concentric coil current, for adjusting axial position of the rotor and flywheel, so that long-term coil current is reduced to nearly zero.

36. The motor/generator of claim 20, including:

polyphase stator windings, having multi-strand insulated conductors formed for blocking and bucking eddy currents therein, embedded in a non-magnetic cylinder affixed to the enclosure, to conduct polyphase currents varying sinusoidally with rotor angle so the resulting stator field is synchronized to rotor angle, for producing torque between the rotor and the stator, and for exchanging electric power with the power interface electronics while incurring minimal hysteresis and eddy losses;

at least one pair of rotor magnets, with one magnet of the pair magnetized radially outward and the other magnetized radially inward, to provide radial flux, which varies essentially sinusoidally with rotor angle, through the stator windings;

rotor angle sensor means, responsive to said radial flux, for providing polyphase feedback signals which vary essentially sinusoidally with rotor angle;

an outer cylinder of high-permeability steel, for supporting the magnets therein and for providing an outer flux path;

an inner cylinder of high-permeability steel, attached to the outer cylinder, for providing an inner flux path, and for completing through the stator windings a flux pattern which rotates with the rotor.

37. The motor/generator of claim 20, including:

polyphase stator windings, having multi-strand insulated conductors formed for blocking and bucking eddy currents therein, embedded in a non-magnetic cylinder affixed to the enclosure, to conduct polyphase currents varying sinusoidally with rotor angle so the resulting stator field is synchronized to rotor angle, for producing torque between the rotor and the stator, and for exchanging electric power with the power interface electronics while incurring minimal hysteresis and eddy losses;

rotor angle sensor means, for providing polyphase feedback signals which vary essentially sinusoidally with rotor angle;

at least one pair of a rotor magnet group each composed of three magnets, wherein the middle magnet of the group is stronger than the other two, with one group magnetized radially outward and the other group magnetized radially inward, to provide radial flux, which varies essentially sinusoidally with rotor angle, through the stator windings;

an outer cylinder of high-permeability steel, for supporting the magnets therein and for providing an outer flux path;

an inner cylinder of high-permeability steel, attached to the outer cylinder, for providing an inner flux path, and for completing through the stator windings a flux pattern which rotates with the rotor.

38. The motor/generator of claim 20, including:

polyphase stator windings, having multi-strand insulated conductors formed for blocking and bucking eddy currents therein, embedded in a non-magnetic cylinder affixed to the enclosure, to conduct polyphase currents varying sinusoidally with rotor angle so the resulting stator field is synchronized to rotor angle, for producing torque between the rotor and the stator, and for exchanging electric power with the power interface electronics while incurring minimal hysteresis and eddy losses;

at least one pair of a rotor magnet group each composed of three magnets, wherein the middle magnet of the group is stronger than the other two, with one group magnetized radially outward and the other group magnetized radially inward, to provide radial flux, which varies essentially sinusoidally with rotor angle, through the stator windings;

rotor angle sensor means, responsive to said radial flux, for providing polyphase feedback signals which vary essentially sinusoidally with rotor angle;

an outer cylinder of high-permeability steel for supporting the magnets therein and for providing an outer flux path;

an inner cylinder of high-permeability steel, attached to the outer cylinder, for providing an inner flux path, and for completing through the stator windings a flux pattern which rotates with the rotor.

* * * * *